US009201651B2

(12) United States Patent  (10) Patent No.: US 9,201,651 B2
Craske  (45) Date of Patent: Dec. 1, 2015

(54) DATA PROCESSING APPARATUS AND METHOD HAVING INTEGER STATE PRESERVATION FUNCTION AND FLOATING POINT STATE PRESERVATION FUNCTION

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 941 days.

(21) Appl. No.: 12/662,783

(22) Filed: May 3, 2010

(65) Prior Publication Data

US 2010/0325397 A1  Dec. 23, 2010

(30) Foreign Application Priority Data

Jun. 19, 2009  (GB) .................................. 0910661.8

(51) Int. Cl.
*G06F 9/46* (2006.01)
*G06F 9/30* (2006.01)

(52) U.S. Cl.
CPC .............. *G06F 9/3013* (2013.01); *G06F 9/461* (2013.01)

(58) Field of Classification Search
CPC ........................................................ G06F 9/462
USPC ......................................................... 712/228
See application file for complete search history.

(56) References Cited

U.S. PATENT DOCUMENTS

| | | | | |
|---|---|---|---|---|
| 5,481,719 A | * | 1/1996 | Ackerman et al. | 718/108 |
| 5,701,508 A | * | 12/1997 | Glew et al. | 712/23 |
| 5,761,491 A | * | 6/1998 | Circello et al. | 712/244 |
| 5,928,356 A | * | 7/1999 | Golliver et al. | 712/228 |

(Continued)

FOREIGN PATENT DOCUMENTS

| | | |
|---|---|---|
| EP | 0 953 905 | 11/1999 |
| EP | 0953905 A2 | 11/1999 |

(Continued)

OTHER PUBLICATIONS

UK Search Report dated Sep. 25, 2009 for GB 0910661.8.

(Continued)

*Primary Examiner* — Andrew Caldwell
*Assistant Examiner* — Keith Nielsen
(74) *Attorney, Agent, or Firm* — Nixon & Vanderhye P.C.

(57) ABSTRACT

A data processing apparatus is described which comprises processing circuitry responsive to data processing instructions to execute integer data processing operations and floating point data processing operations, a first set of integer registers useable by the processing circuitry in executing the integer data processing operations, and a second set of floating point registers useable by the processing circuitry in executing the floating point data processing operations. The processing circuitry is responsive to an interrupt request to perform one of an integer state preservation function in which at least a subset of only the integer registers are copied to a stack memory, and a floating point state preservation function in which at least a subset of both the integer registers and the floating point registers are copied to the stack memory, the one of said integer state preservation function and the floating point state preservation function being selected by the processing circuitry in dependence on state information. In this way, it is possible to reduce the memory size requirement through reduced stack sizes, and to reduce the number of memory accesses required compared with the basic solution of always preserving floating point registers. As a result, power usage and interrupt latency can be reduced.

32 Claims, 14 Drawing Sheets

(56) References Cited

U.S. PATENT DOCUMENTS

| | | | |
|---|---|---|---|
| 6,119,206 A * | 9/2000 | Tatkar et al. | 711/147 |
| 2004/0010789 A1 | 1/2004 | Yamazaki et al. | |
| 2007/0136724 A1 | 6/2007 | Sharma et al. | |
| 2008/0046701 A1 | 2/2008 | Kershaw et al. | |
| 2008/0091920 A1 * | 4/2008 | Shaw et al. | 712/202 |

FOREIGN PATENT DOCUMENTS

| | | |
|---|---|---|
| JP | 8-87420 | 4/1996 |
| TW | 200401187 A | 1/2004 |
| TW | I226983 | 1/2005 |

OTHER PUBLICATIONS

M. Martin et al, "Exploiting Dead Value Information" IEEE, 1997, pp. 125-135.

E. Tune et al, "Balanced Multithreading: Increasing Throughput via a Low Cost Multithreading Hierarchy" Proceedings of the 37$^{th}$ International Symposium on Microarchitecture (MICRO-37'04), 2004.

International Search Report and Written Opinion of the International Searching Authority in corresponding PCT Application PCT/GB2010/000879 dated Jul. 26, 2010.

Japanese Office Action and English translation mailed Oct. 8, 2013 in JP 2012-515549.

Taiwanese Office Action with English Summary dated Mar. 18, 2014 in Taiwanese Application No. 099116532.

Taiwanese Search Report dated Mar. 18, 2014 in Taiwanese Application No. 099116532.

Malaysian Office Action dated Apr. 30, 2014 in ML PI 2011005609, 3 pages.

Israeli Office Action dated Nov. 19, 2014 in corresponding IL application and partial English translation, 4 pages.

International Preliminary Report on Patentability dated Dec. 20, 2011 in PCT/GB2010/000879, 6 pages.

* cited by examiner

FIG. 2A

| xpsr |
|---|
| R15 (PC) |
| R14 (LR) |
| R13 (SP) |
| r12 |
| r11 |
| r10 |
| r9 |
| r8 |
| r7 |
| r6 |
| r5 |
| r4 |
| r3 |
| r2 |
| r1 |
| r0 |

FIG. 2B

| fpexc |
|---|
| fpscr |
| s31 |
| s30 |
| s29 |
| s28 |
| s27 |
| s26 |
| s25 |
| s24 |
| s23 |
| s22 |
| s21 |
| s20 |
| s19 |
| s18 |
| s17 |
| s16 |
| s15 |
| s14 |
| s13 |
| s12 |
| s11 |
| s10 |
| s9 |
| s8 |
| s7 |
| s6 |
| s5 |
| s4 |
| s3 |
| s2 |
| s1 |
| s0 |

DATA PROCESSING APPARATUS AND METHOD HAVING INTEGER STATE PRESERVATION FUNCTION AND FLOATING POINT STATE PRESERVATION FUNCTION

This application claim priority to GB Application No. 0910661.8 filed Jun. 19, 2009, the entire contents of which are incorporated herein by reference.

FIELD OF INVENTION

The present invention relates to a data processing apparatus and method for handling both integer and floating point data processing operations. More particularly, embodiments of the present invention relate to the preservation of data values in processor registers upon a context switch.

BACKGROUND OF THE INVENTION

For many applications, it is desirable for a data processing apparatus to be able to interrupt a current process in which data processing instructions are being executed in order to service another process. While the interrupted process could be terminated entirely and restarted from the beginning once the interrupting process has been serviced, it is desirable to be able to restart the interrupted process from the point at which it was interrupted. In order to achieve this, it is known to copy the contents of a register file storing the current parameters and the current state of the existing process to a stack memory prior to switching to the new process.

A process runs in a context, which is the system state required for the process to run correctly. In the case of an ARM architecture, this state includes the values of certain integer processor registers, including the program counter, stack pointer and link register, and the values of the floating point registers if these are required by the process. Switching between processes therefore requires a switch in the context, including register values, and so a return from an interrupting process to the previous interrupted process therefore requires the preservation and restoration of the context corresponding to the interrupted process.

In the case of a data processing apparatus which provides hardware support by way of dedicated registers only for integer data processing operations, at least some of the integer registers need be preserved in the case of a context switch to service a different process. In the case of a data processing apparatus which additionally provides hardware support for floating point data processing operations by way of dedicated floating point registers, then it is necessary on a context switch to preserve at least some of the floating point registers in addition to the integer registers. This can make it problematic to provide backwards compatibility with code intended to run on a data processing apparatus without hardware support for float operations. The reasons for this are that preserving both the integer registers and the floating point registers would require each process to have sufficient space on its private stack to accommodate the backed up integer and floating point registers, when previously (where hardware floating point support was not provided) the private stacks only needed room to preserve integer registers, and also that the integer and float preservation process significantly increases the interrupt latency compared with the integer only state preservation process of a data processing apparatus without hardware floating point support.

SUMMARY OF INVENTION

According to one aspect of the present invention, there is provided a data processing apparatus, comprising:

processing circuitry responsive to data processing instructions to execute integer data processing operations and floating point data processing operations;

a first set of integer registers useable by said processing circuitry in executing said integer data processing operations, and a second set of floating point registers useable by said processing circuitry in executing said floating point data processing operations;

wherein said processing circuitry is responsive to an interrupt request to perform one of an integer state preservation function in which at least a subset of only said integer registers are copied to a stack memory, and a floating point state preservation function in which at least a subset of both said integer registers and said floating point registers are copied to said stack memory, said one of said integer state preservation function and said floating point state preservation function being selected by said processing circuitry in dependence on state information.

In this way, the more time and space intensive floating point state preservation function (which backs up at least some of both the integer registers and the floating point registers) is conducted only when the state information indicates that the floating point registers need to be backed up. Otherwise, if the state information indicates that only the integer registers need to be backed up, the less time and space intensive integer state preservation function is conducted to back up only the integer registers. As a result, backwards compatibility is preserved, by maintaining interrupt latency and private stack size requirements for integer-only code. Accordingly, undesirable requirements to increase stack-frame sizes on legacy (integer-only) code and to adjust legacy interrupt handlers to accommodate increased latency may be avoided, or at least mitigated. In more general terms, embodiments of the present invention reduce the memory size requirement through reduced stack sizes, and reduce the number of memory accesses compared with the basic solution of always preserving floating point registers. As a result, power usage and interrupt latency can be reduced.

The state information may comprise first state information which is indicative of whether a current data processing context being executed by said processing circuitry when the interrupt request is received is a floating point data processing context which includes one or more floating point data processing operations or an integer data processing context which does not include any floating point data processing operations. This first state information may be set in response to a data processing instruction which causes the processing-circuitry to execute floating point data processing operations. The processing circuitry may be responsive to the interrupt request to perform said integer state preservation function if the first state information indicates that the current data processing context is an integer data processing context, and to perform the floating point state preservation function if the first state information indicates that the current data processing context is a floating point data processing context. This configuration enables floating point state preservation to be conducted only when an interrupted process is using the floating point registers.

When the integer state preservation function is performed, the processing circuitry may set second state information to indicate that the floating point registers have not been copied into the stack memory, and when the floating point state preservation function is performed, the processing circuitry may set the second state information to indicate that the floating point registers have been copied to the stack memory. In this case, the processing circuitry is responsive to the termination of a target data processing context executed by the processing circuitry as a result of the interrupt request to perform one of an integer state recovery function in which only data preserved from the integer registers onto the stack are obtained from the stack and copied into the corresponding registers, and a floating point state recovery function in which data preserved from the integer and floating point registers onto the stack are obtained from the stack and copied into the corresponding registers. In particular, the integer state recovery function is selected by the processing circuitry if the second state information indicates that the floating point registers have not been stored into the stack memory, and the floating point state recovery function is selected by the processing circuitry if the second state information indicates that the floating point registers have been stored into the stack memory.

Alternatively, the processing circuitry may be responsive to the interrupt request to perform the integer state preservation function if the first state information indicates that the current data processing context is an integer data processing context, and to perform, if the first state information indicates that the current data processing context is a floating point data processing context, a first part of the floating point state preservation function in which only the subset of integer registers are copied to the stack memory and a second part of the floating point state preservation function in which space is allocated on the stack memory for the subset of floating point registers. In this case, when the integer state preservation function is performed, the processing circuitry sets second state information to indicate that space for the floating point registers has not been allocated to the stack memory, and when the second part of the floating point state preservation function is performed, the processing circuitry sets the second state information to indicate that space for the floating point registers has been allocated in the stack memory.

The processing circuitry may then be responsive to a data processing instruction following the allocation of space on the stack memory which causes the processing circuitry to execute floating point data processing operations to perform a third part of the floating point state preservation function in which the subset of floating point registers are copied to the allocated portion of the stack memory.

A stack allocation address register may be provided for storing the memory address of the portion of the stack memory allocated in the second part of said floating point state preservation function, wherein the processing circuitry copies the floating point registers to an address within the stack memory indicated by the stack allocation address register in the third part of the floating point state preservation function.

The third state information may be set in the second part of the floating point state preservation function to indicate that space has been allocated in the stack memory but that the copying of the floating point registers has not yet occurred. Here, the third state information is reset as part of the third part of the floating point state preservation function to indicate that the floating point registers have been copied into the allocated space in the stack memory. By utilising the three part floating point state preservation function, the floating point registers are only stored into the stack memory if there is a danger of those registers being overwritten by an interrupting floating point instruction which may modify those registers.

The processing circuitry may then be responsive to the termination of a target data processing context executed by the processing circuitry as a result of the interrupt request to perform one of an integer state recovery function in which only data preserved from the integer registers onto said stack are obtained from the stack and copied into the corresponding registers, and a floating point state recovery function in which data preserved from the integer and floating point registers onto the stack are obtained from the stack and copied into the corresponding registers. In particular, the integer state recovery function is selected by the processing circuitry if the second state information indicates that the floating point registers have not been stored into the stack memory or if the second state information indicates that space has been allocated in the stack memory for the floating point registers and the third state information indicates that the copying of the subset of floating point registers to the allocated portion of the stack memory has not yet occurred, and the floating point state recovery function is selected by said processing circuitry if the second state information indicates that space has been allocated in the stack memory for the floating point registers and the third state information indicates that the subset of floating point registers have been copied to the allocated portion of the stack memory. In this way, if space on the stack has been allocated to the floating point registers but the content of the floating point registers has not actually been copied into the allocated space, only the integer registers are recovered from the stack.

When the integer state recovery function is performed, the first state information is set to indicate that the current data processing context is an integer data processing context, and when the floating point state recover function is performed, the first state information is set to indicate that the current data processing context is a floating point data processing context.

The processing circuitry may be responsive to fourth state information to select between a floating point state preservation function in which the floating point registers are copied to the stack memory in response to the interrupt request, and a floating point state preservation function in which space in the stack memory is allocated for the floating point registers in response to the interrupt request and in which the floating point registers are copied into the allocated space in response to a data processing instruction following the allocation of space on the stack memory which causes the processing circuitry to execute floating point data processing operations. In this way, it is possible to select between a mode in which deferred floating point preservation is enabled, and a mode in which it is disabled.

In another embodiment, the state information may comprise first state information which is indicative of whether a current data processing context being executed by the processing circuitry when the interrupt request is received is a floating point data processing context which includes one or more floating point data processing operations or an integer data processing context which does not include any floating point data processing operations. The state information may also include second state information which is indicative of whether a target data processing context to be executed by the processing circuitry as a result of said interrupt request is a floating point data processing context which includes one or more floating point data processing operations or an integer data processing context which does not include any floating point data processing operations. In this way, it is possible to make the decision regarding when to conduct a floating point state preservation process a function of the processor state at the time of the exception or interrupt (current process), and the processor state required by the destination handler process.

The state information may also comprise third state information which is indicative of whether a current data processing context is a thread data processing context which has not been triggered by an interrupt request, or a handler data processing context which has been triggered by an interrupt request. This makes it possible to handle transitions from a thread to a handler differently to transitions from a handler to a handler. To explain further, two basic modes of execution can be considered, these being thread and handler. A thread mode is a baseline process, that is, a process which is not triggered by an interrupt or exception. A handler mode is an interrupting mode which interrupts either a thread mode process or another handler process. In other words, the destination of an exception or interrupt is always a handler, but the origin may be either a thread or a handler. Usually, a thread is assumed to relate to the execution of tasks/processes, while a handler provides privileged execution for exceptions and interrupts. Embodiments of the present invention provide additional machine state that annotates each handler as either using the floating point hardware (a float-handler), or not (an integer-handler). Similarly, additional machine state can be provided indicating that the current thread uses the floating point hardware (a float-thread) or not (an integer-thread).

In one embodiment, the additional machine state is used to limit floating point state preservation to the case where the destination process is a "float-handler" and the origin process is not an "integer-thread" (i.e. where the origin is either a float-thread, a float handler or an integer handler). As a result, floating point state preservation does not take place if the interrupting handler is an integer handler, because the interrupting process will not overwrite the floating point registers. Furthermore, even if the interrupting handler is a floating point handler, floating point preservation does not take place if the interrupted (origin) process is an integer thread, because in this case the floating point registers which may be overwritten by the floating point handler are not required by the interrupted process, and the interrupted process does not itself interrupt any other process which might require the floating point registers (because it is a thread rather than a handler).

The processing circuitry may be responsive to state information indicating that the target data processing context is a floating point data processing context, and that the current data processing context is either a floating point data processing context, or an integer data processing context triggered by an interrupt request, to select the floating point state preservation function. In this way, floating point state preservation can be provided for potentially active floating-point state. In other words, where the target data processing context will have access to the floating point registers, the data values stored in the floating point registers are preserved if there is a possibility that they store data required for an interrupted process.

The processing circuitry may be responsive to state information indicating that the current data processing context is an integer data processing context and that the target data processing context is an integer data processing context to select the integer state preservation function. In this way, the latency of a state preservation function in the case of an integer exception remains constant with legacy code.

The processing circuitry may be responsive to state information indicating that the current data processing context is a floating point data processing context and that the target data processing context is a floating point data processing context to select the floating point state preservation function. In this way, floating point state preservation can be provided for potentially active floating-point state.

The processing circuitry may be responsive to state information indicating that the current data processing context is an integer data processing context not triggered by an interrupt request, and that the target data processing context is a floating point data processing context, to select the integer state preservation function. In this way, it becomes unnecessary to provide for float-frame storage when backing up integer threads. It will be appreciated that when backing up integer handlers, it cannot be assumed that preservation of the floating point registers is not required, because the integer handler may itself have interrupted a floating point thread or handler, in which case the content of the floating point registers may be required in the future (when processing returns to that earlier thread or handler), and may not have previously been preserved. For this reason, it is envisaged that in the case of an integer handler being interrupted by a floating point handler, the floating point registers would be preserved.

As an alternative, additional state information indicating whether a previous (interrupted) process made use of floating point registers could be stored in a register and referred to at the time of determining whether to perform the integer or floating point state preservation function, instead of making the determination dependent on whether the origin process is a thread or a handler.

The data processing apparatus may include an interrupt controller for generating the interrupt requests. The interrupt controller may be arranged to store state information regarding a target process in association with one or more possible interrupt requests for triggering target processes, and to communicate the state information associated with a selected one of the possible interrupt requests to the processing circuitry along with the selected interrupt request.

Alternatively, a conventional interrupt controller could be used, and a state information store for storing the state information in association with one or more possible interrupt requests could be provided separately, for instance within the processor itself, or within main memory. The processing circuitry would in this case be configured to read the state information from the state information store in response to a received interrupt request.

Once the integer or floating point state preservation function has been completed, the state of the system needs to be set up for the target data processing context, while setting register information to enable the processing circuitry to return to the current data processing context once the target data processing context has completed or terminated. In one example a first configuration register into which the second state information is stored prior to commencement of the target data processing context, and a second configuration register into which the first and third state information is stored prior to commencement of the target data processing context may be provided. The first configuration register may be a dedicated configuration register indicating a current floating point state of the system (that is, whether a currently executing context is an integer or floating point context), and the second configuration register may be a link register for indicating the stack pointer of the previous data processing context, and an indication of whether the previous data processing context is an integer data processing context or a floating point data processing context. In this case, when a target data processing context is to be started, the processing circuitry sets the link register to indicate the stack pointer of the current data processing context, and to indicate whether the current data processing context is an integer data processing context or a floating point data processing context. In this way, the processing circuitry will have access to the information required (stack identification and the amount of data backed up to the stack) to enable a return to the current data processing context once the target data processing context has completed. It will be appreciated that the link register is the mechanism traditionally used in function calls and for servicing interrupts. In the case of a function call, a branch instruction writes the address of its following instruction in the link register and branches to the specified location. To return after the branch has completed, the processor uses the value which was stored into the link register to determine exactly where to go back to. The same applies on entering an exception, whereby an exception return value would traditionally be stored in the link register. However, it is possible, and may in some cases be useful, to use a register other than the link register to store a return value for a function call or interrupt.

The first set of integer registers may comprise a register for storing a stack pointer, the stack pointer pointing to the top of a process stack when the current data processing context is a thread, and pointing to the top of a main stack when the current data processing context is a handler. In this case, the stack pointer can be used to determine whether a current context is a thread or a handler, and thus the active stack pointer may be used as the third state information.

In this case, when the first set of integer registers comprises a link register, the processing circuitry may be responsive to the interrupt request to set the link register to indicate the stack pointer of the current data processing context, and the indication of whether the current data processing context is an integer data processing context or a floating point data processing context. The processing circuitry will then be responsive to the termination of the target data processing context to perform one of the integer state recovery function and the floating point state recovery function using the information stored in the link register.

The state information may be hard wired, or may alternatively be configurable by the processing circuitry under the control of an operating system or other program code.

A problem which could arise in only preserving the contents of the floating point registers in certain cases is that an error in programming might cause a data processing operation intended to operate in an integer context to attempt to use the floating point registers. If permitted, this would overwrite registers which have not been stored to the stack, thereby causing errors in subsequent execution of an interrupted process. To avoid this, an embodiment of the invention provides that, if the target data processing operation triggered by the interrupt request attempts to use the floating point registers when the state information indicates that the target data processing context is an integer data processing context, the processing circuitry generates an exception before the floating point registers are overwritten. The processor can then handle this exception in an appropriate manner.

There are several options for transferring the content of the registers to the stack. For example, the floating point state preservation function may be conducted by first copying the first set of integer registers to the stack, and then copying the second set of floating point registers to the top of the stack. As will be appreciated, the process of copying the register values to the stack takes a certain period of time. In order that higher priority interrupts can be processed more quickly, the processing circuitry is responsive to a higher priority interrupt requiring an integer state preservation function received while the floating point state preservation function is being conducted to inhibit the copying of the second set of floating point registers to the stack, and to set a stack pointer to indicate the first set of integer registers to be at the top of the stack. This improves the timeliness of the state preservation process when two interrupts are received close together, and reduces processing and energy requirements. More particularly, this assists the realisation of the integer-handler latency benefits by providing for late-arrival of a higher priority interrupt in the form of the ability to abandon float stacking in favour of taking an integer handler.

As an alternative, the floating point state preservation function may be conducted by first copying the second set of floating point registers to the stack, and then copying the first set of integer registers to the stack. In this case, the processing circuitry is responsive to a higher priority interrupt requiring an integer state preservation function received while the floating point state preservation function is being conducted to complete storage of both the floating point registers and integer registers to the stack, and to generate further state information indicating that the interrupting floating point process was interrupted before the floating point state preservation process had completed and that the floating point register values stored to the stack are no longer required. As a result, this further state information can be used when returning to the earlier process to cause only the relatively smaller amount of data relating to the integer registers to be copied from the stack to the integer registers, rather than copying the relatively larger amount of data relating to both the integer and floating point registers.

Under certain circumstances, for instance in a legacy mode, it may be desirable to deactivate the floating point state preservation function. In this case, the processing circuitry may be responsive to an override signal to perform the integer state preservation function in response to an interrupt request irrespective of the state information.

According to another aspect of the invention, there is provided a data processing method of executing integer data processing operations and floating point data processing operations in response to data processing instructions, said integer data processing operations using a first set of integer registers, and said floating point data processing operations using a second set of floating point registers, the method comprising the steps of:

performing, in response to an interrupt request, one of an integer state preservation function in which at least a subset of only said integer registers are copied to a stack memory, and a floating point state preservation function in which at least a subset of both said integer registers and said floating point registers are copied to said stack memory, said one of said integer state preservation function and said floating point state preservation function being selected in dependence on state information.

Various other aspects and features of the present invention are defined in the claims, and include a computer program product.

BRIEF DESCRIPTION OF THE DRAWINGS

Embodiments of the invention will now be described, by way of example only, with reference to the accompanying drawings in which:

FIG. 2 schematically illustrates an example set of integer registers (FIG. 2A) and an example set of floating point registers (FIG. 2B);

DESCRIPTION OF EXAMPLE EMBODIMENTS

Figure 1:
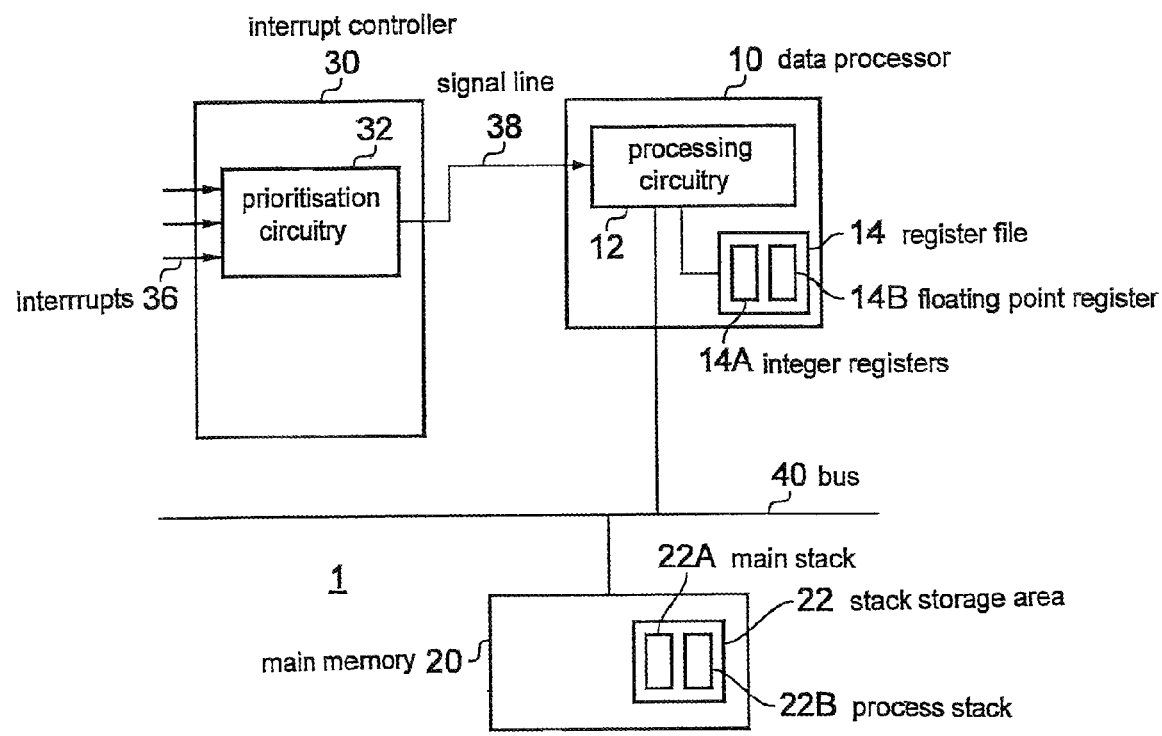
FIG. 1 schematically illustrates a data processing apparatus in which integer registers and floating point registers are preserved to a stack memory in response to an interrupt request from an interrupt controller.

Referring to FIG. 1, a data processing apparatus 1 is shown which comprises a data processor 10, a main memory 20, an interrupt controller 30 and a bus 40. The data processor 10 comprises processing circuitry 12 and a register file 14. The register file 14 includes a set of integer registers 14A and a set of floating point registers 14B. The processing circuitry 12 is operable in response to data processing instructions to execute data processing operations utilising the values stored in the integer registers 14A and floating point registers 14B of the register file 14. More particularly, integer data processing operations are executed by the processing circuitry 12 using the integer registers 14A, while floating point data processing operations are executed by the processing circuitry 12 using both the integer registers 14A and the floating point registers 14B.

The integer registers 14A may include general purpose registers for storing data values for use and manipulation by the processing circuitry 12, and may include registers which have a dedicated purpose (although in some cases these may also be used as general purpose registers). In the case of an ARM-based processor architecture, 16 integer registers are provided. These include a program counter (register 15), a link register (register 14) and a stack pointer (register 13). The program counter stores the memory address of a current instruction being executed by the processing circuitry 12. The link register stores, in the case of a branch from a first process to a second process, a memory address of a next instruction within the first process to be executed when the branch to the second process has been completed. The stack pointer stores an address indicating the top of a stack associated with a current process.

The main memory 20 is operable to store data values for a variety of purposes, and is accessible by the data processor 10 via the bus 40. The bus 40 may itself include a data bus for carrying data values, an address bus for carrying address signals indicative of storage locations within the main memory and a control bus for exerting control signals for controlling the reading and writing of data to and from the main memory 40. The main memory 20 comprises a stack storage area 22 which provides a storage area for a main stack (MSP) 22A and a process stack (PSP) 22B. A stack is a last-in-first-out (LIFO) data structure whereby new data values are added to the stack by "pushing" them on to the top of the stack, and are subsequently accessed by "popping" them off the top of the stack. In either case, a stack pointer (in the present case stored in register 13) is updated to reflect the new position of the top of the stack. In an ARM architecture, a process stack is provided which is used by "thread" processes (that is, processes which have not been triggered by interrupts or exceptions), and a main stack is provided which provides a "privileged" mode for use by "handler" processes (that is, processes which have been triggered by interrupts or exceptions). In addition, each of several handler processes can treat a different part of the process stack as its own private stack by making use of private stack pointers.

The interrupt controller 30 includes prioritization circuitry 32 for receiving interrupts 36 and selecting a highest priority interrupt from the received interrupts to be applied to the processing circuitry 12 of the data processor 10 via a signal line 38. The received interrupts 36 may be hardware interrupts received from peripheral devices or other hardware components of the data processing apparatus 1, or may be software interrupts issued by the processing circuitry 12 in response to data processing instructions.

In operation, the processing circuitry 12 executes a stream of data processing instructions of a current process until an interrupt is received from the interrupt controller 30 via the signal line 38. The received interrupt indicates that the current process should be suspended while a new process is serviced. In order that the current process can be resumed, information relating to the current process is to be stored so that it can be restored in due course. This information to be stored includes at least a portion of the contents of one or both of the integer registers 14A and the floating point registers 14B of the register file 14. In particular, the integer registers 14A will be stored by both an integer state preservation function and a floating point state preservation function, whereas the floating point registers 14B will be stored only by the floating point state preservation function. The floating point state preservation function can therefore be initiated only when the state of the system at the time of an interrupt requires the preservation of the floating point registers.

When the interrupting process terminates, the processing circuitry 12 is operable to recover the state information (including the register values preserved to the stack) and then continue the interrupted process from the point at which it was interrupted.

Referring now to FIGS. 2A and 2B, example integer and floating point processor register banks are schematically illustrated. It will be appreciated that embodiments of the present invention are equally applicable to other sets of integer and floating point registers. FIG. 2A illustrates a set of 17 integer registers r0 to r15 and xpsr. Registers r0 to r15 are general purpose registers (although register r13 functions as a stack pointer, register r14 functions as a link register and register r15 functions as a program counter). Register xpsr is a program status register which indicates the current state of the system. The integer registers which are to be backed up as part of an integer or floating point state preservation function are registers r0 to r3, r12, r14, r15 and xpsr. The remaining registers need not be backed up in the case of an interrupt being received.

FIG. 2B illustrates a set of 34 floating point registers s0 to s31, fpscr and fpexc. Registers s0 to s31 are general purpose registers. Register fpscr is a floating point status and control register which contains status and control bits for floating point operations. Register fpexc is a floating point exception register for recording an exception status relating to a floating point process. The floating point registers which are to be backed up as part of a floating point state preservation function are s0 to s15, fpscr and fpexc. The remaining registers need not be backed up in the case of an interrupt being received.

Two reasons for not backing up the entirety of the integer registers and floating point registers are that the storage operation takes a finite period of time, increasing latency on a context switch, and also that backing up the entirety of the registers would require increased stack size for the processes being switched. It is recognised that not all registers need be backed up in order to store the state of the system to the extent necessary to permit a process to be returned to after an interrupting process has been completed. In particular a procedure call standard may require a new context to manually preserve and restore some registers if it wishes to use them.

Figures 3A, 3B, 3C:
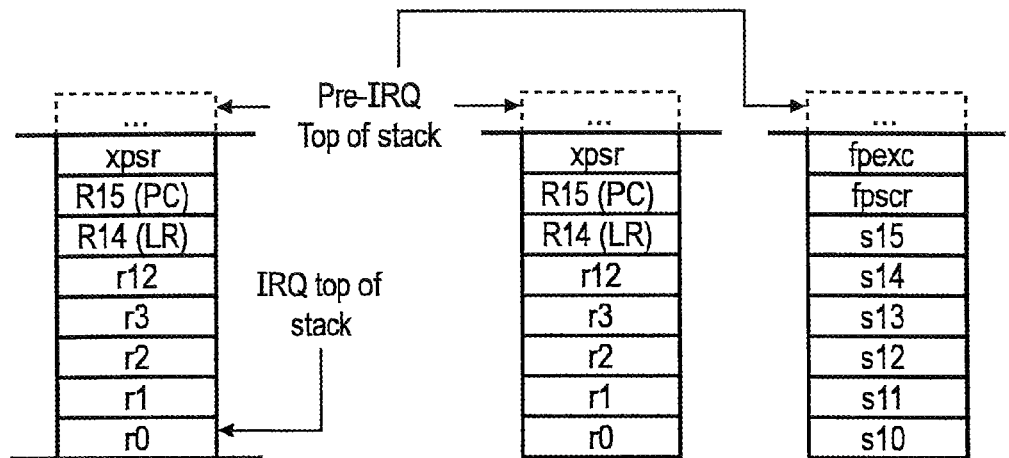
FIG. 3 schematically illustrates the storage of register entries in the stack for an example integer state preservation operation (FIG. 3A) and two example floating point state preservation operations (FIGS. 3B and 3C)

Referring now to FIGS. 3A, 3B and 3C, example portions of a stack are schematically illustrated which include register contents backed up from the integer and floating point registers shown in FIGS. 2A and 2B. In particular, FIG. 3A shows the top portion of a stack following an integer state preservation operation in which the content of registers r0 to r3, r12, r14, r15 and xpsr have been stored to the top of the stack. The previous (pre-interrupt request IRQ) top of stack position is shown in FIG. 3A. The new top of stack position corresponds to the position within the memory at which the value of integer register r0 is stored. In an ARM architecture, when items are added to the stack, the memory address of the top of the stack is actually decremented because the stack memory is filled from the top (highest address value) down.

In FIG. 3B, the top portion of a stack following a floating point state preservation operation is shown. This includes, at positions which correspond with those of FIG. 3A, the backed up values of the integer registers r0 to r3, r12, r14, r15 and xpsr. However, stored above these (closer to the top of the stack) are the backed up values of the floating point registers s0 to s15, fpscr and fpexc. The previous (pre-interrupt request IRQ) top of stack position is shown in FIG. 3B. The new top of stack position corresponds to the address at which the value of floating point register s0 is stored.

In FIG. 3C, as with FIG. 3B the top portion of a stack following a floating point state preservation operation is shown. However, unlike FIG. 3B, the floating point registers are backed up first, and then the integer registers are stored on top of the floating point registers. Accordingly, the integer registers r0 to r3, r12, r14, r15 and xpsr are stored closer to the top of the stack than the floating point registers s0 to s15, fpscr and fpexc. The previous (pre-interrupt request IRQ) top of stack position is shown in FIG. 3C. The new top of stack position corresponds to the position within the memory at which the value of integer register r0 is stored.

As will be appreciated, the storage of data values from the integer and floating point registers onto the stack takes a finite period of time. During this time, it is possible that another, higher priority, interrupt will be received by the processing circuitry 12, and that in this case the previous interrupt (which triggered an integer and floating point state preservation function) will be cancelled and the higher priority interrupt serviced. In this case, if the higher priority interrupt relates to an integer process the floating point registers will not be used and therefore may (in some embodiments) no longer need to be preserved. The manner in which this situation may be dealt with depends on the order in which the integer registers and floating point registers are stored to the stack. In the case of the order illustrated in FIG. 3B, the storage to the stack of the floating point registers as part of the floating point state preservation function could be terminated, and the top of stack pointer set to r0. The stack pointer, as well as an indication of whether the interrupted process is an integer or floating point process, will be copied to the link register when the interrupting process starts, and can be used obtain access to the stack to restore the register values when the interrupted process is recommenced. The indication of whether the interrupted process is an integer or floating point process can be used to determine whether only the integer registers need to be restored, or whether both the integer and floating point registers need to be restored.

In the case of the order illustrated in FIG. 3C, the storage to the stack of both the floating point and integer registers will be completed, but the preserved floating point register values will not be restored when the interrupted process recommences, because the processing circuitry will determine that only the integer registers need to be restored, and therefore the portion of the stack storing the floating point registers will be ignored during a state recovery function.

In general terms, depending on a decision made in dependence on state information, the processing circuitry 12 will either transfer only the contents of (at least some of) the integer registers to a stack, or will transfer the contents of (at least some of) both the integer and floating point registers to a stack. Then, once the required registers have been copied to the stack, the incoming process can utilise the registers as required without destroying state information or data which will be required when returning to the earlier process.

First Embodiment

A first embodiment will now be described in which the selection of the integer or floating point state preservation function at the time of an interrupt request is conducted in dependence on whether the current data processing context (the context being interrupted) is an integer context which uses only the integer registers, or a floating point context using both the integer registers and the floating point registers. In particular; an integer state preservation function is performed if the current context is an integer context whereas a floating point state preservation function is performed if the current context is a floating point context.

Figure 4:
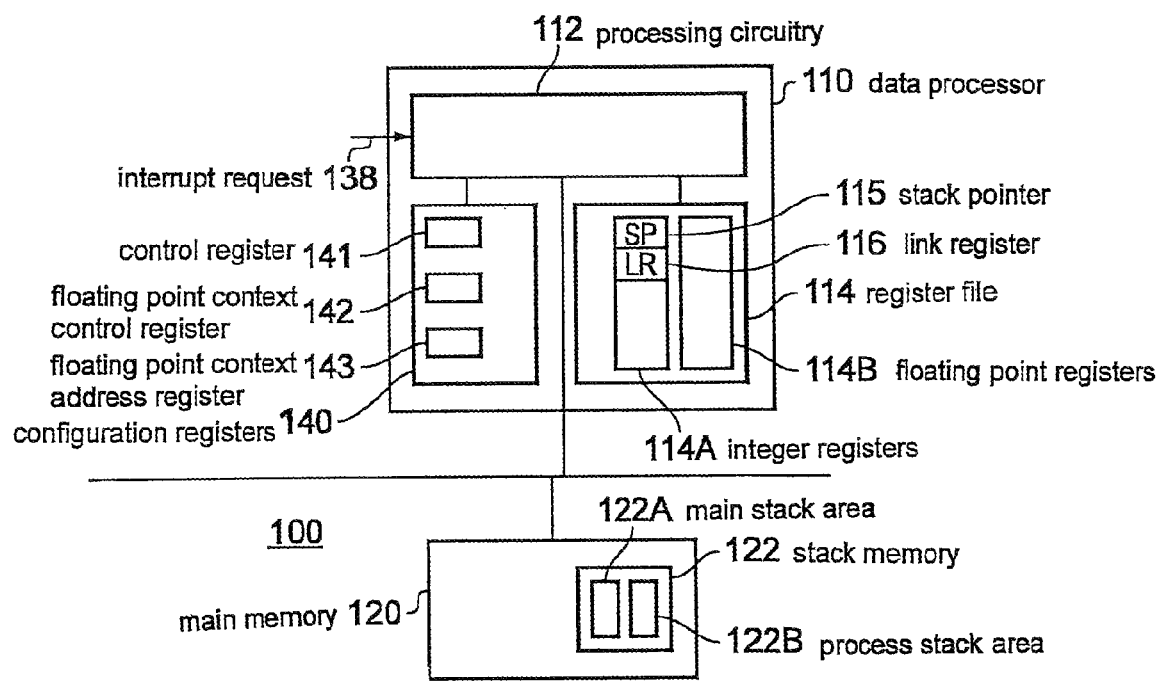
FIG. 4 schematically illustrates a data processing apparatus according to a first embodiment in which integer or floating point state preservation is carried out in dependence on whether a current data processing context is an integer context or a floating point context.

Referring to FIG. 4, an apparatus 100 according to the first embodiment is schematically illustrated in which a data processor 110 has processing circuitry 112 which is response to an interrupt request 138 received from an interrupt controller to suspend a current context, preserve state information (register contents) relating to the current (suspended) context, and service a new (interrupting) context. In FIG. 4, as with FIG. 1, a register file 114 includes a set of integer registers 114A and a set of floating point registers 114B. The integer registers 114A are shown in this case to include a stack pointer (SP)

115 and a link register (LR) 116 which are utilised in a state recovery process to be described later. As with FIG. 1, a main memory 120 of the data processing apparatus 100 includes a stack memory 122 which is configured to store content relating to the integer and/or floating point processor registers into either a main stack area 122A or a process stack area 122B in dependence on whether the interrupted data processing context is a thread or a handler. In particular, if the interrupted process is a thread, the registers relating to that process will be copied into the main stack by a state preservation function, whereas if the interrupted process is a handler, the registers relating to that process will be copied into the process stack by the state preservation function.

The data processor 110 also comprises a set of configuration registers 140, including a control register 141, a floating-point context control register (FPCCR) 142, and a floating point context address register (FPCAR) 143. These configuration registers are described below:

| Control Register | | |
|---|---|---|
| Bit [2] | Bit [1] | Bit [0] |
| Current Context Int/FP | Stack in use | Privilege of Thread Mode |

The control register 141 is a 3 bit register having a first bit (bit [2]) which indicates whether a currently running context is an integer or floating point context, a second bit (bit[1]) which indicates which of a main (MSP) stack and a process (PSP) stack is being used in the current context, and a third bit (bit [0]) which indicates the privilege state of a thread mode. For the purpose of the first embodiment, bit [2] is the component of the control register 141 which is of particular interest, because the selection of the state preservation function to be performed is conducted based on whether the current context is an integer context or a floating point context.

| FPCCR | | | |
|---|---|---|---|
| Bit [31] | Bit [30] | Bits [29:1] | Bit [0] |
| ASPEN | LSPEN | Privilege/Reserved | LSPACT |

The floating-point context control register (FPCCR) 142 is a register which will typically be accessible only to software running in a privileged mode. The floating-point context control register 142 includes a bit [31] (ASPEN) which is settable to indicate whether a floating point state preservation function is available. The integer state preservation function is assumed always to be available. More particularly, bit [31], if set to make the floating point state preservation function available, enables a bit [2] of the control register 141 described above to be set on execution of a floating point instruction, resulting in automatic hardware state preservation and restoration for a floating point context on exception entry and exit. The floating-point context control register 142 also includes a bit [30] (LSPEN) which enables and disables automatic lazy floating point state preservation (described later). The floating-point context control register 142 also includes a bit [0] (LSPACT) indicating that lazy floating point state preservation is active, and in particular indicating that a floating point stack frame has been allocated on the stack, but that saving state (content of processor registers) to it has been deferred. The floating-point context control register 142 includes a number of other bits (bits [29:1]) which are either reserved for other uses or provide state information for preserving priority and privilege information relating to an interrupted process pending a return to the interrupted process.

| FPCAR | |
|---|---|
| Bits [31:3] | Bits [2:0] |
| Address | Reserved |

In order to achieve deferred floating point state preservation, the floating-point context address register (FPCAR) 143 is provided, which as with the floating-point context control register 142 is accessible only in a privileged mode. The floating-point context address register 143 stores an address (in bits [31:3]) indicating a position in the stack to which the floating point registers are to be subsequently copied in the case of a deferred floating point state preservation function. Bits [2:0] are reserved.

In operation, bit [2] of the control register 141 is used by the processing circuitry 112 to record whether a floating point instruction is being executed. Bit [2] of the control register 141 is set in dependence on whether an instruction currently being executed is using only integer registers, or both integer registers and floating point registers. For example:

ADD r0,r0,#1 (1)

CMP r0,#3 (2)

is purely integer code using "rX" integer registers, and is thus an integer context. In particular, instruction (1) serves to increment the value in integer register r0 by 1, and instruction (2) serves to compare a value stored in integer register r0 with the number 3. In both cases these instructions operate only on integer registers.

In contrast, the following instructions:

VADD.F32 s0,s0,s1 (3)

VCMP.F32 s0,#0 (4)

make use of the floating-point instructions and "sX" floating-point registers (as well as integer registers and instructions), and thus form a floating point context. In particular, instruction (3) adds the values stored in floating point registers s0 and s1 together and stores the result in floating point register s0. Instruction (4) compares the value stored in floating point register s0 with the value 0. Execution of the VADD.F32 (if this is the first VFP instruction) will cause bit [2] of the control signal 141 to be set, indicating that the context is now a floating point context.

A simple example of the use of an integer context could be a function taking a pointer to two integer values, multiplying them and returning the result:

C-Code:

```
int integer_mul(int *int_array)
{
    return int_array[0] * int_array[1];
}
```

Assembly Equivalent:

LDR r1,[r0]; load int_array[0] into r1 (r0 contains pointer)

LDR r2,[r0,#4]; load int_array[1] into r2

MUL r0,r1,r2; multiply into r0 (return value)

BX lr; return from function

A simple example of a floating point context could be the same function taking a pointer to two floating point values, multiplying them together and returning the result:

C-Code:

```
float float_mul(float *float_array)
{
    return float_array[0] * float_array[1];
}
```

Assembly Equivalent:
 VLDR s1,[r0]; load float_array[0] into s1 (r0 contains pointer)
 VLDR s2,[r0,#4]; load float_array[1] into s2
 VMUL.F32 s0,s1,s2; multiply into s0 (return value)
 BX lr; return from function If VLDR was the first VFP instruction encountered in the current context, then it would cause the context to become a VFP context, whereupon bit [2] of the control register 141 would be set.

If a current data processing context is pre-empted by an interrupt, and bit [2] of the control register 141 is set, then bit [31] of the floating point context control register 142 indicates to the processing circuitry 112 whether to allocate a floating point frame (for floating point state preservation) or an integer frame (for integer state preservation). A further bit of the floating point context control register 142 (bit [30]) indicates whether to populate the floating point frame in the stack at the time of allocation or to defer populating the floating point frame until a later time. If deferred, a further bit in the floating point context control register 142 (bit [0]) is set, and the address of the empty floating point frame in the stack memory is recorded into the floating point context address register (FPCAR) 143.

On entry to an interrupt, bit [2] of the control register 141 is inverted, and the inverted value is set as a frame size indicating bit in the link register 116. This bit is used to indicate the size of the frame (integer frame or floating point frame) allocated or copied into the stack memory 122. Once this bit is set in the link register 116, bit [2] of the control register 141 is cleared to a value of zero. If a floating point instruction is executed whilst bit [2] of the control register 141 is clear and bit [0] of the floating point context control register 142 is set to a value of one (indicating floating point frame allocated but not yet stored), then the floating point content still inside the floating point registers 114B is stored to the address specified in the floating point context address register 143, and bit [0] of the floating point context control register 142 is cleared to zero (to indicate that the floating point registers have now been stored to the allocated space in the stack) and bit [2] of the control register 141 (first state information) is then set.

On return from an interrupting process when the frame size indicating bit in the link register 116 is clear (zero), indicating that a floating point frame has been allocated, then if bit [0] of the floating point context control register 142 is set to a value of one to indicate that the floating point frame has been allocated in the stack but not populated, then the floating point frame in the stack is simply skipped over, because bit [0] is in this case indicating that copying of the floating point registers to the allocated space in the stack never occurred. However, if bit [0] of the floating point context control register 142 is clear (zero), as will be the case once the content of the floating point registers 114B has been copied into the stack 122, then the stacked floating point frame is loaded back into the floating point registers 114B. Bit [2] of the control signal is then updated in dependence on whether the apparatus is returning to an integer context or a floating point context. Bit [2] is updated independently of whether or not state was restored. This fundamentally implements a hardware based lazy context switching system.

Return from an interrupt is implemented using the link register 116, which is set at the time of the interrupt to specify a return value which indicates to the processor to which stack (main or process) state information of the interrupted context was stored, how much information was stored (integer frame or floating point frame), and whether the process being returned to is a thread or a handler. An example of the return values which can be set in the link register 116 to achieve this are shown below:

TABLE 1

Exception Return Values for Link Register

| EXC_RETURN | Return to | Return stack | Destination uses FP |
|---|---|---|---|
| 0xFFFF_FFE1 | Handler Mode | MSP | Yes |
| 0xFFFF_FFE9 | Thread Mode | MSP | Yes |
| 0xFFFF_FFED | Thread Mode | PSP | Yes |
| 0xFFFF_FFF1 | Handler Mode | MSP | No |
| 0xFFFF_FFF9 | Thread Mode | MSP | No |
| 0xFFFF_FFFD | Thread Mode | PSP | No |

It can be seen from Table 1 that the penultimate hexadecimal value in the exception return value is either E or F, with a value of E indicating (column 4) that the destination (return) context is a floating point context, and a value of F indicating that the destination context is an integer context. This value therefore implements the frame size indicating bit described above. It can also be seen that the final hexadecimal value in the exception return value is either 1, 9 or D, with a value of 1 indicating (columns 2 and 3) a return to the main (MSP) stack into a handler mode, a value of 9 indicating a return to the main stack into a thread mode, and a value of D indicating a return to the process (PSP) stack into a thread mode.

Figure 5:
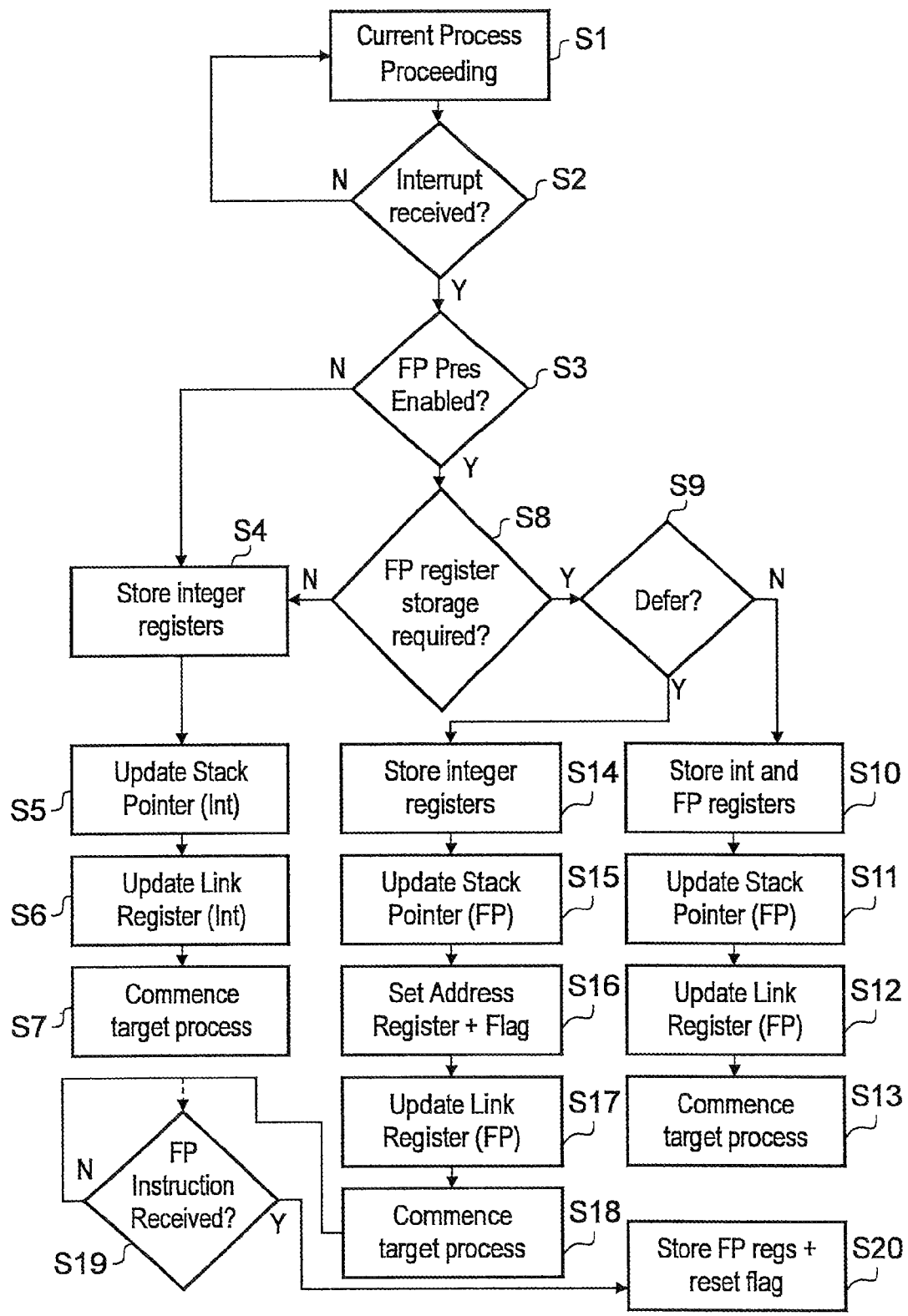
FIG. 5 is a schematic flow diagram illustrating the operation of a state preservation function according to the first embodiment.

FIG. 5 schematically illustrates a state preservation process according to the first embodiment. In particular, at a step S1, a current process is proceeding. At a step S2, it is determined whether an interrupt has been received which has a higher priority than the process currently being executed. In the case where no interrupt is received, or an interrupt is received which has a lower priority than the currently executing process, the process reverts to the step S1. When, at the step S2, it is determined that an interrupt request is received which has a higher priority than the currently executing process, it is determined at a step S3 whether floating point state preservation is enabled based on bit [31] of the floating point context control register 142. If it is determined, at the step S3 that floating point state preservation is not enabled, then an integer state preservation function is conducted at a step S4. As described above, the integer state preservation function causes predetermined ones of the integer registers to be copied to the stack. When the integer registers have been stored to the stack, the stack pointer indicating the top of the stack is updated to reflect the new top of stack position at a step S5. This will involve modifying the stack pointer by an amount equal to an integer frame of preserved register content. The link register 116 is then updated with an exception return address at a step S6 to include a bit to indicate that an integer frame has been stored to the stack and to indicate to which stack the registers have been stored (MSP or PSP). The target (interrupting) process then commences at a step S7, in which the integer registers (and potentially the floating point registers) may be overwritten.

If at the step S3 it is determined that floating point state preservation is enabled, then it is then determined at a step S8 whether floating point register storage is required based on whether the current process is operating in an integer data processing context or a floating point data processing context, as indicated by bit [2] of the control register 141. If it is determined that the current context is an integer context, then the process is directed to the steps S4 to S7 which are conducted as described above. However, if it is determined at the step S8 that the current context is a floating point context, then a floating point state preservation function is conducted. In particular, at a step S9, it is determined whether the storage of the floating point registers should be conducted immediately (at the time of stack allocation) or deferred, based on bit [30] of the floating point context control register 142. If it is determined at the step S10 that the storage of the floating point context is not to be deferred, then the process progresses to a step S10, where both the integer and floating point registers are copied into the stack memory. The stack pointer is then updated at a step S11 to reflect the new top of stack position by modifying the stack pointer by an amount equal to a floating point frame of preserved register content. The link register 116 is then updated with an exception return address at a step S12 to include a bit to indicate that a floating point frame has been stored to the stack. The target (interrupting) process then commences at a step S13, in which the integer registers (and potentially the floating point registers) may be overwritten.

If it is determined at the step S9 that copying of the floating point registers to the stack is to be deferred, then at a step S14 only the integer registers are copied to the stack. Then, at a step S15, the stack pointer is updated to indicate to reflect the new top of stack position by incrementing the stack pointer by an amount equal to a floating point frame of preserved register content. In this way, although only the integer registers have been copied to the stack, space is allocated in the stack for the floating point registers. Moreover, at a step S16, an address register is set to store an address value indicating the location of the allocated area in the stack to which the floating point registers may be copied, and a flag is set in the floating point context control register 142 (bit [0]) to indicate that space for the floating point registers has been allocated on the stack, but that copying of the floating point registers into the allocated space has not yet been conducted. The link register 116 is then updated with an exception return address at a step S17 to include a bit to indicate that a floating point frame has been stored to the stack. In this way, a return to the interrupted process using the link register 116 will obtain the floating point register content from the stack if the floating point registers have been copied. If the floating point registers have not been copied then the empty portion of the stack can be ignored during state recovery (described below). The target (interrupting) process then commences at a step S18.

At a step S19, the process monitors received instructions following the commencement of the target process to determine if a floating point instruction is to be executed which would cause the floating point registers to be overwritten. If such an instruction is not received then the monitoring process of step S19 continues. If such an instruction is received then the floating point state preservation process terminates at a step S20 by storing the floating point registers into the allocated space indicated by the address register, and resetting the flag in the floating point context control register 142 (bit [0]) to a value of zero to indicate that copying of the floating point registers has now been conducted. It should be noted that the trigger for copying the floating point registers into the allocated space on the stack may not simply be an instruction which uses the floating point registers, it will preferably be an instruction which will actually modify the content of the floating point registers.

Figure 6:
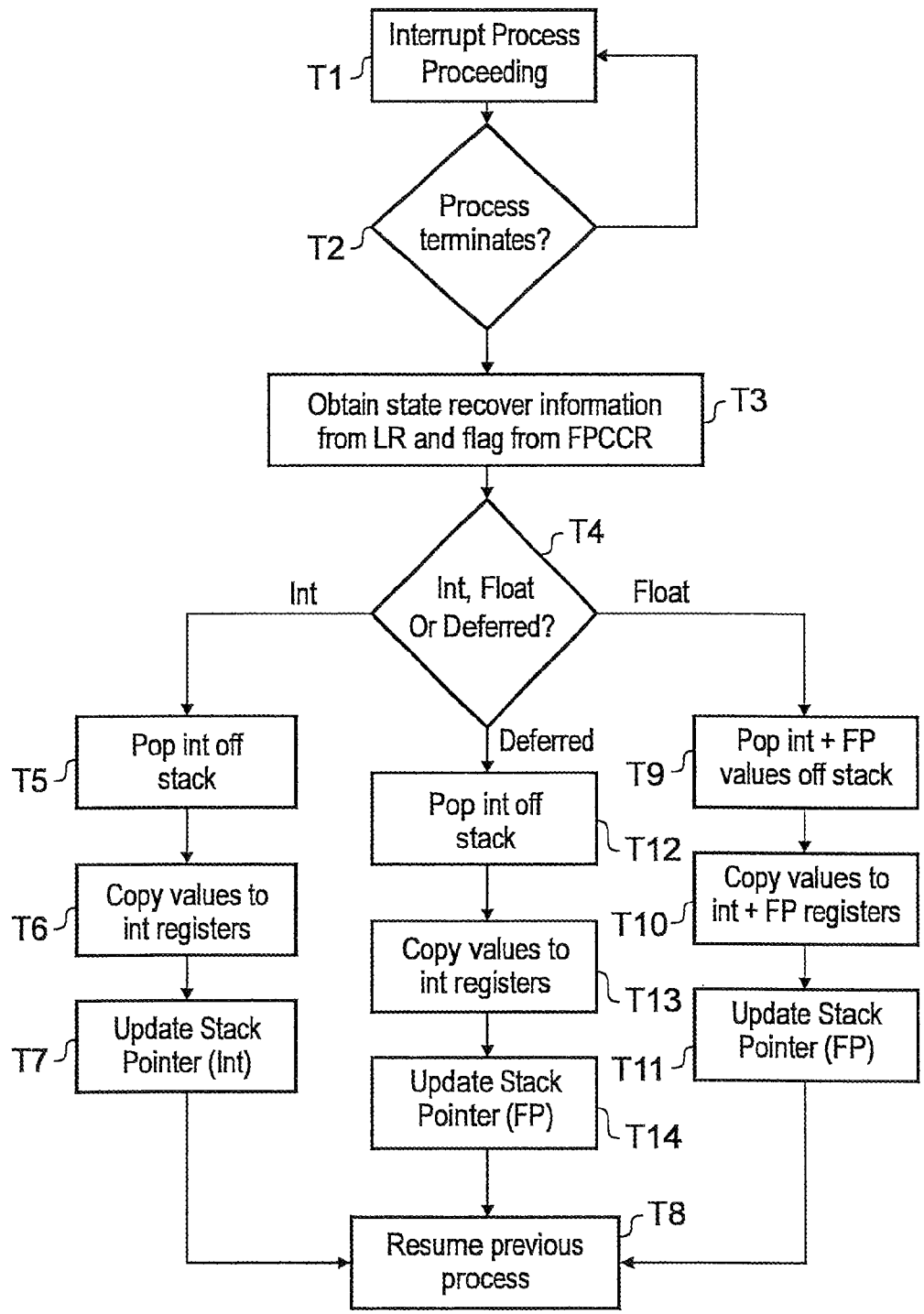
FIG. 6 is a schematic flow diagram illustrating the operation of a state recovery function according to the first embodiment.

FIG. 6 schematically illustrates a state recovery process according to the first embodiment. In particular, the method illustrated provides a context switch from the target (interrupting) process back to the thread or handler process which was interrupted by the target process. At a step T1, the process triggered by an interrupt proceeds until it terminates at a step T2. Once the process terminates at the step T2, the link register 116 is read at a step T3 to determine to which stack (MSP or PSP) the state information of the interrupted process was copied, and whether an integer frame of data or a floating point frame of data was stored to that stack (the frame size indicating bit). At a step T4 it is determined based on the frame size indicating bit, and based on the flag in the floating point context control register 142, whether (a) an integer frame was allocated and copied, (b) a floating point frame was allocated and copied (either immediately or after a subsequent floating point instruction), or (c) a floating point frame was allocated but not populated (because no floating point instruction was executed prior to the interrupting process terminating at the step T2). If it is determined at the step T4 that only an integer frame was allocated and stored to the stack, the appropriate amount of data is popped from the stack at a step 15 to obtain the data values of the integer registers, and the obtained values are stored to the corresponding registers at a step T6. Then, at a step T7, the stack pointer is updated to indicate a new top of stack position, which will differ from the previous top of stack position by an amount equal to an integer frame. The previous process is then resumed at a step T8.

If it is determined at the step T4 that a floating point frame was allocated to and stored in the stack, a larger amount of data (corresponding to a floating point frame) is popped off the stack at a step T9, and copied to the integer and floating point registers at a step T10. Then, at a step T7, the stack pointer is updated to indicate a new top of stack position, which will differ from the previous top of stack position by an amount equal to a floating point frame. The previous process is then resumed at a step T8.

If it is determined at the step T4 that a floating point frame was allocated to but not actually stored to the stack, a smaller amount of data (corresponding to an integer frame) is popped off the stack at a step T9, and copied to the integer registers at a step T10. Then, at a step T7, the stack pointer is updated to indicate a new top of stack position, which will differ from the previous top of stack position by an amount equal to a floating point frame, because the space required by the floating point frame would have been allocated, even if not ultimately used. The previous process is then resumed at a step T8.

The first embodiment is now further explained with reference to state diagrams which schematically illustrate the setting of various register bits to transition the data processing apparatus being first, second, third and fourth states.

Figure 7:
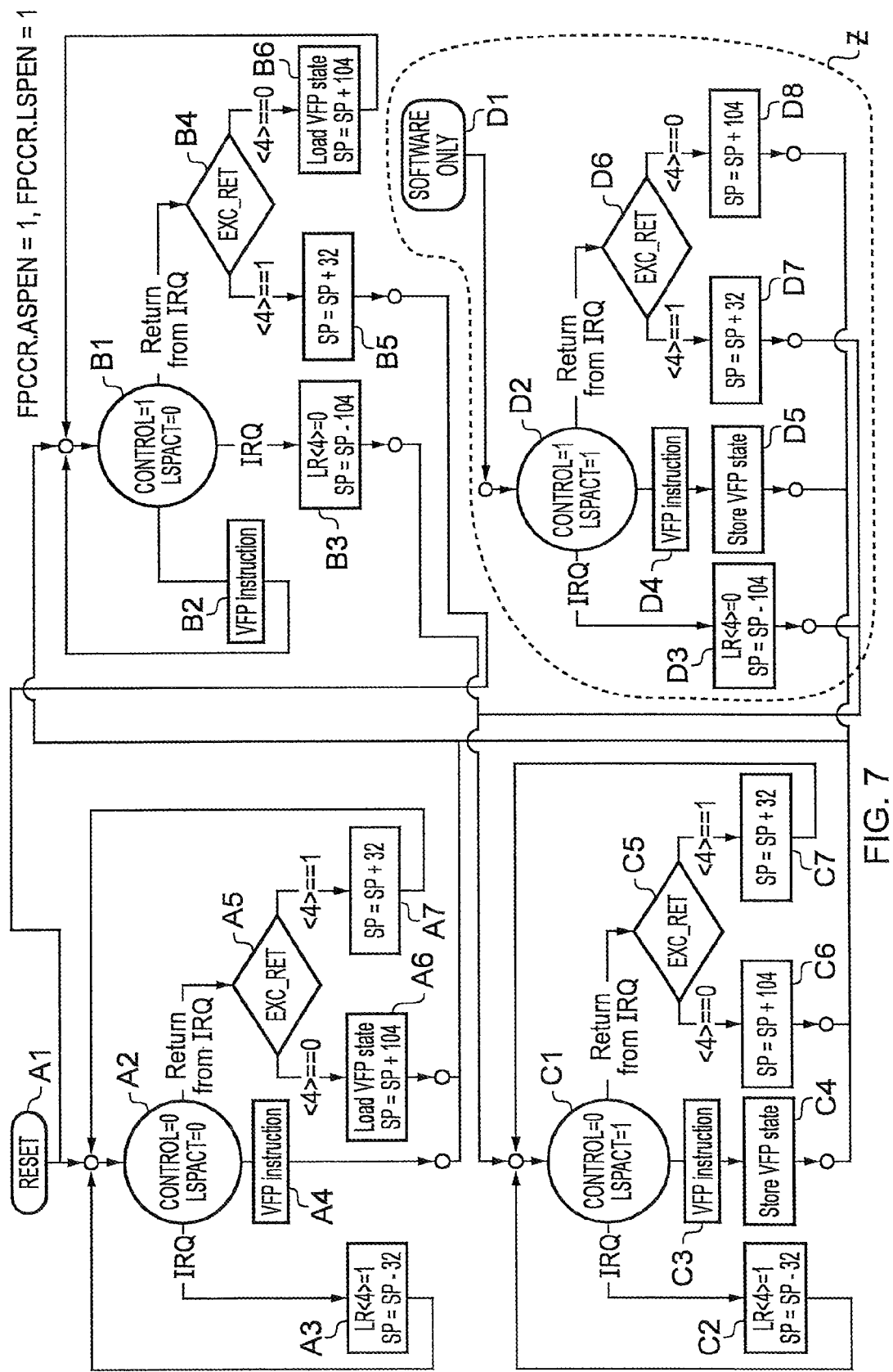
FIG. 7 is a state diagram which schematically illustrates the operation of the first embodiment in a mode in which floating point state preservation and deferred preservation are both enabled.

Referring first to FIG. 7, the ASPEN and LSPEN bits in the FPCCR are set such that both floating point state preservation and lazy context switching are available. In this case, first, second and third states of the apparatus are attainable by hardware based state preservation and recovery functions, and a fourth state is attainable only by direct software control. The portion of the state diagram accessible only by direct software control is indicated by the region Z.

In FIG. 7, at a step A1, the data processing apparatus is reset, or switched on, whereby the apparatus enters the first state in which a first control bit (bit [2] of the control register 141) is set to zero, and a second control bit (bit [0] of the FPCCR) is set to zero, at a step A2. The first state is a state in which a current data processing context is an integer data processing context. If an interrupt request (IRQ) is received at a step A3 while the apparatus is in the first state, an integer state preservation function is initiated, and a third control bit is set in the link register to have a value which is the inverse of the first control bit. As the first control bit has a value of zero while the apparatus is in the first state, the third control bit to be stored in the link register 116 is set to a value of one. To service the interrupt request, the contents of (some of) the integer registers is stored to the stack, and the stack pointer is updated to reflect the new top of the stack, in this case 32 bytes (corresponding to eight 32 bit registers being copied to the stack) from the previous top of stack position. It will be noted that due to the nature of the stack in an ARM architecture, the modification of the stack pointer when items are added to the stack is conducted by decrementing the stack pointer. Similarly, when items are removed from the stack, the modification of the stack pointer is conducted by incrementing the stack pointer.

If a return from an interrupting process (exception return) occurs at a step A5 while the apparatus is in the first state, then it is determined whether the interrupted process operated in an integer context where the apparatus was in the first state or the third state (indicated by the third control bit being set to a value of one), or in a floating point context where the apparatus was in the second state or the fourth state (indicated by the third control bit being set to a value of zero). If the interrupted process operated in an integer context then the integer state recovery function is performed at the step A7 by popping the preserved integer register content from the stack and updating the stack pointer to reflect the new top of the stack, in this case 32 bytes (corresponding to eight 32 bit registers being popped off the stack) from the previous top of stack position. In this case, the apparatus remains in the first state once the integer state recovery function has been performed. If the interrupted process operated in a floating point context then the floating point state recovery function is performed at the step A6 by popping the preserved integer and floating point register content from the stack and updating the stack pointer to reflect the new top of the stack, in this case 104 bytes (corresponding to twenty six 32 bit registers being popped off of the stack) from the previous top of stack position. In this case, the apparatus is caused to enter the second state at a step B1 once the floating point state recovery function has been performed. This is because a floating point state recovery function is followed by the continuation of a floating point data processing context.

If a floating point instruction is received at a step A4 while the apparatus is in the first state, the apparatus is caused to enter the second state at the step B1, because this will mark the initiation of a floating point data processing context. When the apparatus enters the second state, the first control bit is set to one, but the second control bit remains at zero.

In the second state, if a floating point instruction is executed at a step B2, no change of state occurs and the apparatus remains in the second state. This is because the second state always represents a floating point data processing context. However, if an interrupt request is received at a step B3 while the apparatus is in the second state, a floating point state preservation function is initiated, and a third control bit is set in the link register to have a value which is the inverse of the first control bit. As the first control bit has a value of one while the apparatus is in the second state, the third control bit to be stored in the link register is set to a value of zero. To service the interrupt request, the contents of (some of) the integer registers is stored to the stack, but because FIG. 7 represents a system state in which the copying of floating point registers is deferred, the floating point registers are not stored into the stack at this time. However, the stack pointer is updated to reflect the new top of the stack at a position which allocates space on the stack for the floating point registers, in this case 104 bytes (corresponding to twenty six 32 bit registers being copied to the stack) from the previous top of stack position. Once the link register and stack pointer have been updated, the apparatus is caused to enter the third state at a step C1.

If a return from an interrupting process (exception return) occurs at a step B5 while the apparatus is in the second state, then it is determined whether the interrupted process operated in an integer context where the apparatus was in the first state or the third state (indicated by the third control bit being set to a value of one), or in a floating point context where the apparatus was in the second state or the fourth state (indicated by the third control bit being set to a value of zero). If the interrupted process operated in an integer context then the integer state recovery function is performed at the step B6 by popping the preserved integer register content from the stack and updating the stack pointer to reflect the new top of the stack, in this case 32 bytes (corresponding to eight 32 bit registers being popped off the stack) from the previous top of stack position. In this case, the apparatus is caused to enter the first state at a step A2 once the integer state recovery function has been performed. This is because an integer state recovery function is followed by the continuation of an integer data processing context. If the interrupted process operated in a floating point context then the floating point state recovery function is performed at the step B6 by popping the preserved integer and floating point register content from the stack and updating the stack pointer to reflect the new top of the stack, in this case 104 bytes (corresponding to twenty six 32 bit registers being popped off of the stack) from the previous top of stack position. In this case, the apparatus remains in the second state once the floating point state recovery function has been performed.

The third state is one in which the first control bit (bit [2] of the control register 141) is set to zero (as with the first state) to indicate that the current context is an integer data processing context, and a second control bit (bit [0] of the FPCCR) is set to a value of one, to indicate that space is currently allocated in the stack memory for the floating point registers, but that the floating point registers have not yet been copied into the allocated space. If a floating point instruction is received at a step C3 while the apparatus is in the third state, the apparatus is caused to store the floating point state (floating point registers) into the allocated space in the stack memory at a step C4, and to then enter the second state at the step B1, because the execution of the received floating point instruction will mark the initiation of a floating point data processing context. When the apparatus enters the second state, the first control bit is set to one, and the second control bit is reset to zero.

If an interrupt request (IRQ) is received at a step C2 while the apparatus is in the third state, an integer state preservation function is initiated, and a third control bit is set in the link register to have a value which is the inverse of the first control bit. As the first control bit has a value of zero while the apparatus is in the third state, the third control bit to be stored in the link register is set to a value of one. To service the interrupt request, the contents of (some of) the integer registers is stored to the stack, and the stack pointer is updated to reflect the new top of the stack, in this case 32 bytes (corresponding to eight 32 bit registers being copied to the stack) from the previous top of stack position.

If a return from an interrupting process (exception return) occurs at a step C5 while the apparatus is in the third state, then it is determined whether the interrupted process operated in an integer context where the apparatus was in the first state or the third state (indicated by the third control bit being set to a value of one), or in a floating point context where the apparatus was in the second state or the fourth state (indicated by the third control bit being set to a value of zero). If the interrupted process operated in an integer context then the integer state recovery function is performed at the step C7 by popping the preserved integer register content from the stack and updating the stack pointer to reflect the new top of the stack, in this case 32 bytes (corresponding to eight 32 bit registers being popped off the stack) from the previous top of stack position. In this case, the apparatus remains in the third state once the integer state recovery function has been performed. If the interrupted process operated in a floating point context then the floating point state recovery function is performed at the step C6 by popping the preserved integer and floating point register content from the stack and updating the stack pointer to reflect the new top of the stack, in this case 104 bytes (corresponding to twenty six 32 bit registers being popped off of the stack) from previous top of stack position. In this case, the apparatus is caused to enter the second state at a step B1 one the floating point state recovery function has been performed. This is because a floating point state recovery function is followed by the continuation of a floating point data processing context.

The fourth state is accessible only by software at a step D1, and is a state in which the first control bit (bit [2] of the control register 141) is set to a value of one, and the second control bit (bit [0] of the FPCCR) is set to a value of one, at a step D2. The fourth state is a state in which a current data processing context is a floating point data processing context, and in which space is currently allocated in the stack memory for the floating point registers, but that the floating point registers have not yet been copied into the allocated space (as indicated by the fact that the second control bit is set to a value of one).

In the fourth state, if a floating point instruction is received at a step D4, the apparatus is caused to store the floating point state (floating point registers) into an allocated space in the stack memory at a step D5, and to then enter the second state at the step B1. When the apparatus enters the second state, the first control bit remains set to a value of one, but the second control bit is reset to zero.

If an interrupt request is received at a step D3 while the apparatus is in the fourth state, a floating point state preservation function is initiated, and a third control bit is set in the link register to have a value which is the inverse of the first control bit. As the first control bit has a value of one while the apparatus is in the fourth state, the third control bit to be stored in the link register is set to a value of zero. To service the interrupt request, the contents of (some of) the integer registers is stored to the stack, but because FIG. 7 represents a system state in which the copying of floating point registers is deferred, the floating point registers are not stored into the stack at this time. However, the stack pointer is updated to reflect the new top of the stack at a position which allocates space on the stack for the floating point registers, in this case 104 bytes (corresponding to twenty six 32 bit registers being copied to the stack) from the previous top of stack position. Once the link register and stack pointer have been updated, the apparatus is caused to enter the third state at a step C1.

If a return from an interrupting process (exception return) occurs at a step D6 while the apparatus is in the fourth state, then it is determined whether the interrupted process operated in an integer context where the apparatus was in the first state or the third state (indicated by the third control bit being set to a value of one), or in a floating point context where the apparatus was in the second state or the fourth state (indicated by the third control bit being set to a value of zero). If the interrupted process operated in an integer context then the integer state recovery function is performed at the step D7 by popping the preserved integer register content from the stack and updating the stack pointer to reflect the new top of the stack, in this case 32 bytes (corresponding to eight 32 bit registers being popped off the stack) from the previous top of stack position. In this case, the apparatus is caused to enter the third state at a step A2 once the integer state recovery function has been performed. If the interrupted process operated in a floating point context then the floating point state recovery function is performed at the step D8 by popping the preserved integer and floating point register content from the stack and updating the stack pointer to reflect the new top of the stack, in this case 104 bytes (corresponding to twenty six 32 bit registers being popped off of the stack) from the previous top of stack position. In this case, the apparatus enters the second state once the floating point state recovery function has been performed.

Figure 8:
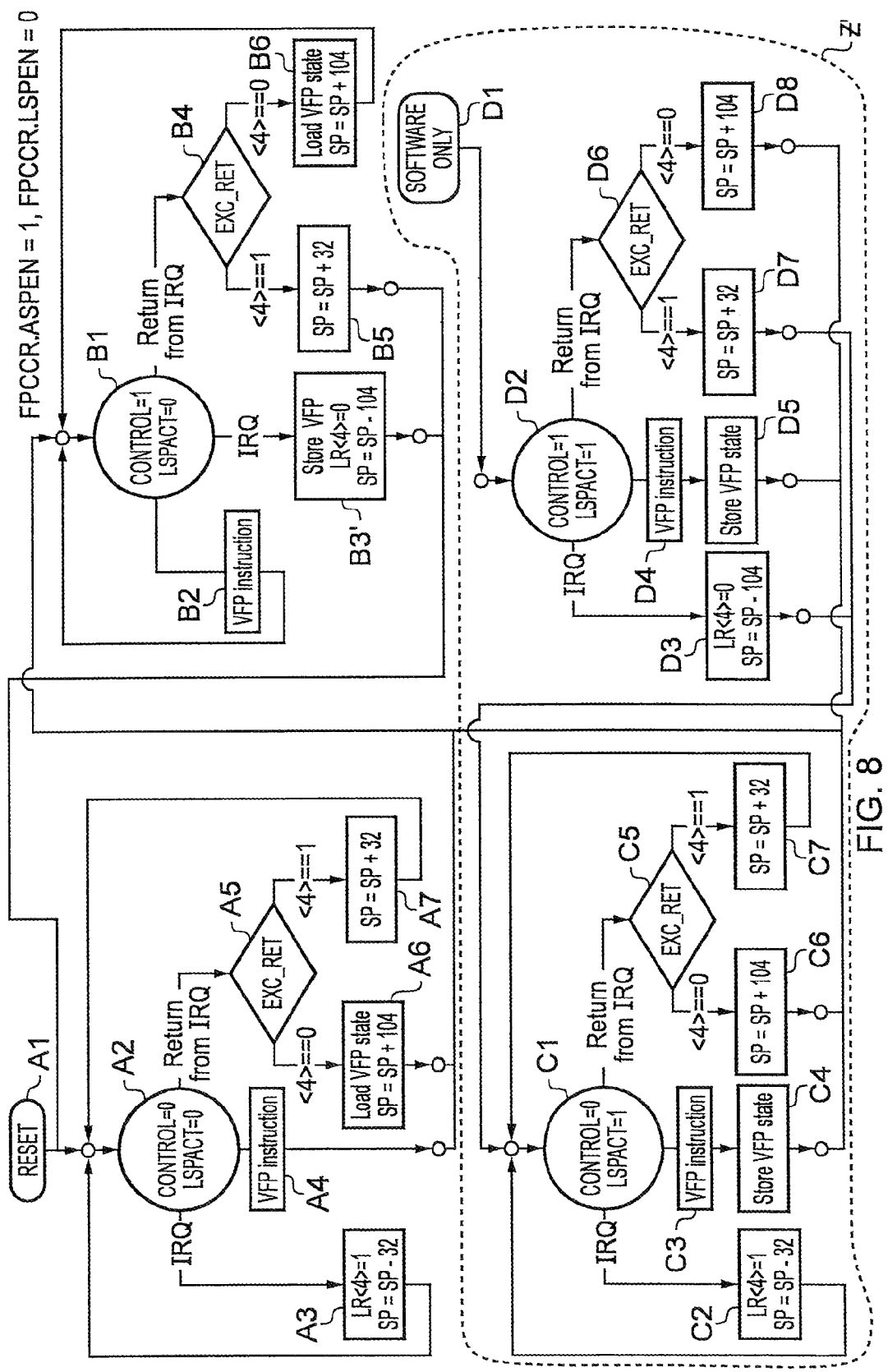
FIG. 8 is a state diagram which schematically illustrates the operation of the first embodiment in a mode in which floating point state preservation is enabled but in which deferred preservation is disabled.

In FIG. 8, the ASPEN bit in the FPCCR is set such that floating point state preservation is available, but the LSPEN bit in the FPCCR is set such that lazy context switching is not available. Accordingly, the third and fourth states described above with reference to FIG. 7 are only available under direct software control. The portion of the state diagram accessible only by direct software control is indicated by the region Z'.

In this case, the operation of the apparatus in the first state is identical to that described above with reference to FIG. 7. However, the operation of the apparatus in the second state, while similar to that described above, differs in that the content of the floating point registers is copied (along with the integer registers) into the stack memory immediately at a step B3' (which corresponds to step B3 in FIG. 7), rather than the copying of the floating registers being deferred until a subsequent floating point operation is received while the apparatus is in the third state. In addition, whereas the step B3 in FIG. 7 transitioned into the third state, the step B3' in FIG. 8 transitions into the first state. The third state is only available via the fourth state (which is itself only available via direct software control).

Figure 9:
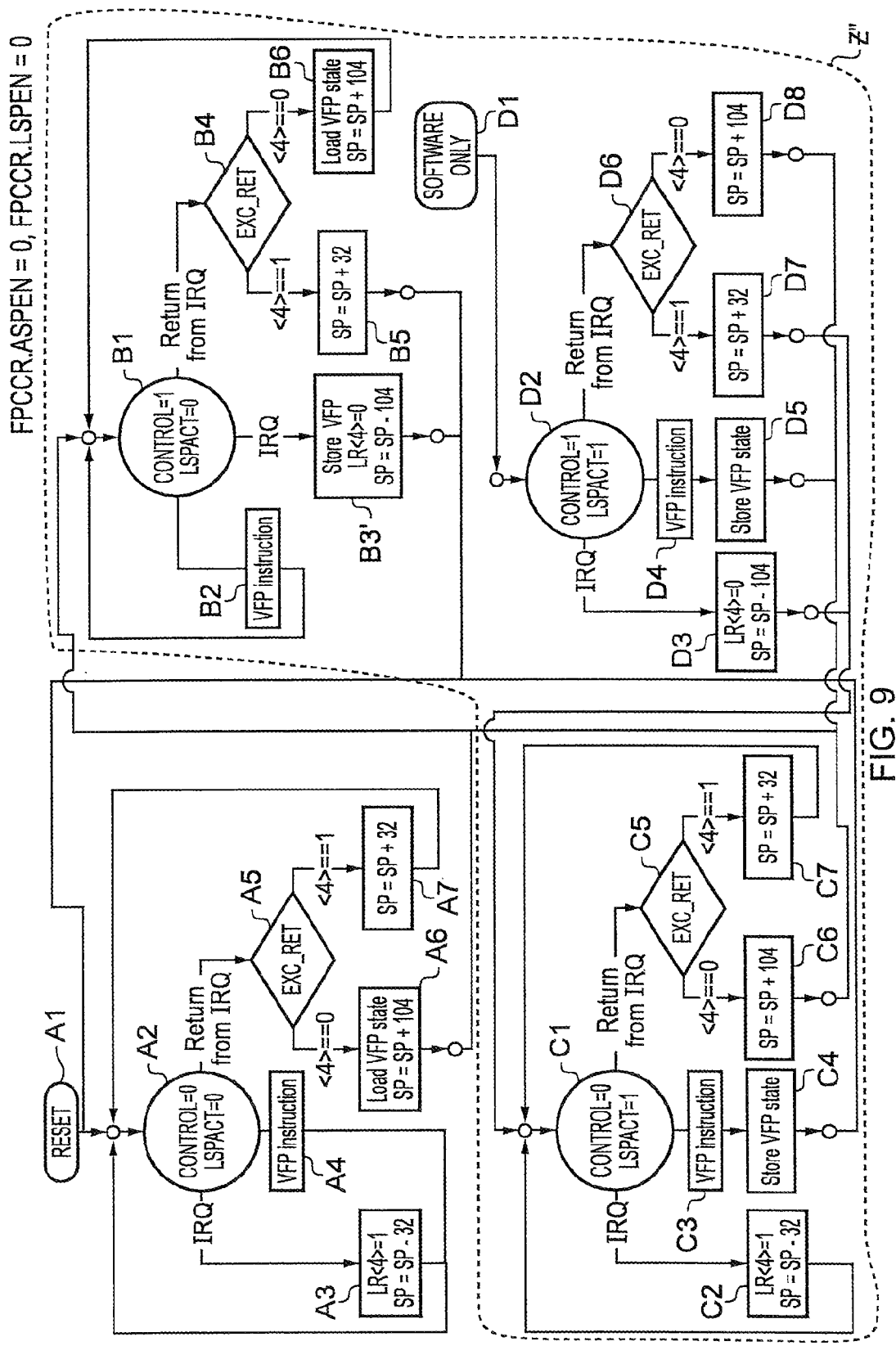
FIG. 9 schematically illustrates the operation of the first embodiment in a mode in which both floating point state preservation and deferred preservation are disabled.

In FIG. 9, the ASPEN and LSPEN bits in the FPCCR are set such that neither floating point state preservation nor lazy context switching are available. Accordingly, the second, third and fourth states described above with reference to FIG. 7 are only available under direct software control. The portion of the state diagram accessible only by direct software control is indicated by the region Z".

In this case, the apparatus is tied to the first state, and floating point instructions received at a step A4' corresponding to step A4 in FIGS. 7 and 8 do not cause the apparatus to change to a different state. It is noted that when the apparatus is tied to the first state, the step A6 will not be reached (other than via direct software control from one of the second, third and fourth states) because bit 4 of the link register can only be set to one (the inverse of the control bit, which is fixed at zero in the case of the apparatus being tied to the first state).

Second Embodiment

A second embodiment will now be described in which a determination of which of the two sets of registers to store is made on the basis of (a) whether the current process is a thread, that is a process which has not been triggered by an interrupt, or a handler, that is a process which has been triggered by an interrupt, (b) whether the current process is an integer process which does not use the floating point registers or a floating point process which does use the floating point registers, and (c) whether the interrupting process is an integer process which does not use the floating point registers or a floating point process which does use the floating point registers.

Figure 10:
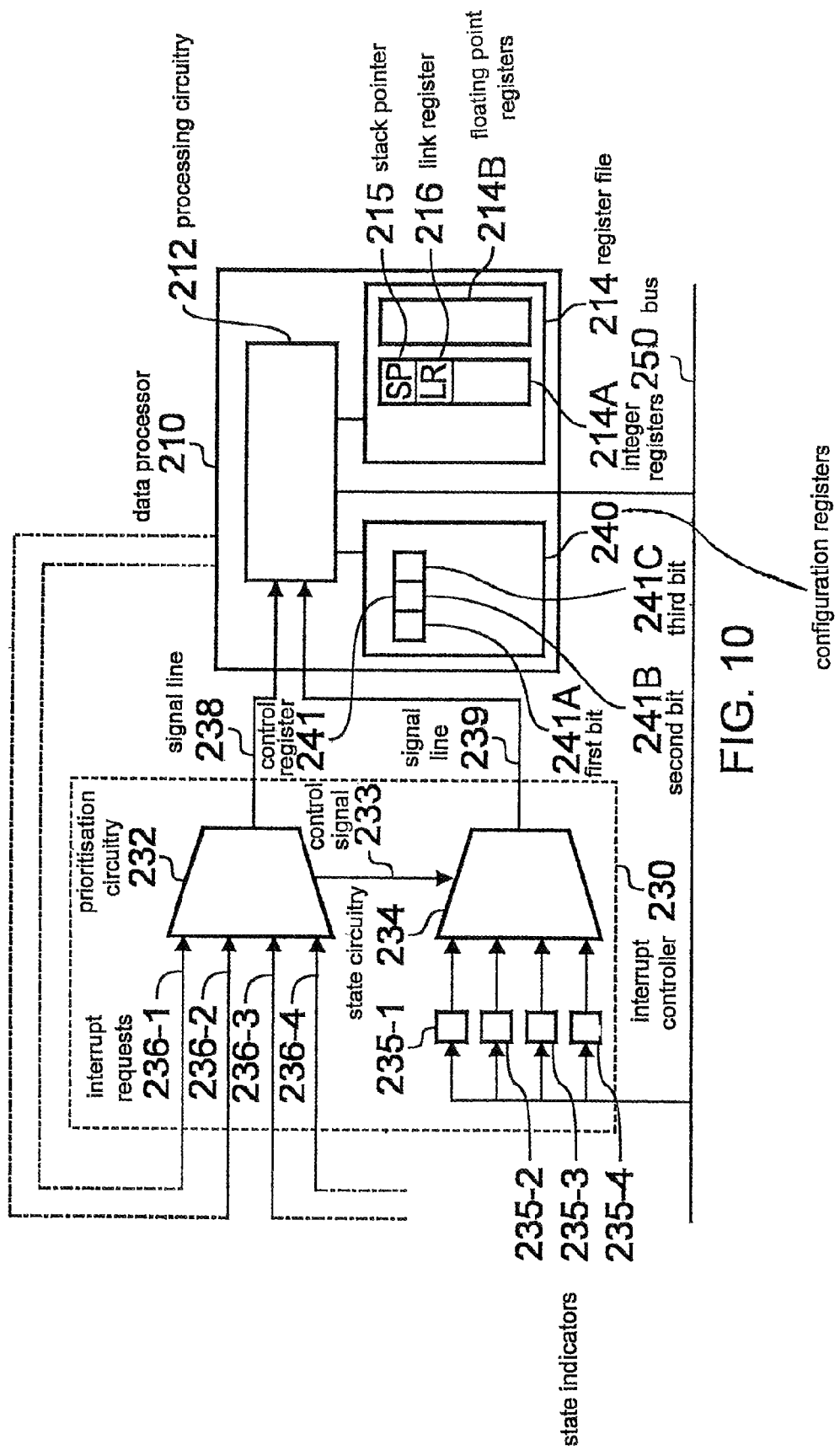
FIG. 10 schematically illustrates a first example data processing apparatus according to a second embodiment in which integer or floating point state preservation is carried out in dependence on (a) whether a current data processing context is an integer context or a floating point context, (b) whether the current data processing context is a thread or a handler, and (c) whether an interrupting data processing context is an integer context or a floating point context, and in which state information is provided by an interrupt controller.

Referring to FIG. 10, an example data processor 210 and interrupt controller 230 are schematically illustrated in which state circuitry 234 providing an indication of whether an interrupting process is an integer process or a floating point process is provided within the interrupt controller 230. The data processor 210 and the interrupt controller 230 are coupled together via a bus 250. The data processor 210 comprises (in a similar manner to FIG. 1) processing circuitry 212 and a register file 214. The register file 214 comprises integer registers 214A (which include a stack pointer 215 and a link register 216) and floating point registers 214B. The interrupt controller 230 comprises prioritization circuitry 232 which takes the form of a multiplexer which selects between incoming interrupt requests 236-1 to 236-4 on the basis of relative priority. In this case interrupt requests 236-1 and 236-2 are software interrupts generated by the processing circuitry 212, while interrupt requests 236-3 and 236-4 are hardware interrupts generated by hardware devices (not shown). The prioritization circuitry 232 selects between the interrupt requests 236-1 to 236-4 to generate an interrupt signal which is applied to the processing circuitry 212 via signal line 238 to indicate an interrupting process to be serviced by the processing circuitry 212.

The prioritization circuitry 232 also generates a control signal 233 which indicates to state circuitry 234 the interrupt request which has been selected. The state circuitry 234 takes the form of a multiplexer which selects between state indicators 235-1 to 235-4 in dependence upon the received control signal 233. Each of the state indicators 235-1 to 235-4 corresponds to one of the interrupt requests 236-1 to 236-4. The state circuitry 234 therefore generates a control signal which is applied to the processing circuitry 212 and which indicates the state of the received interrupt and in particular indicates if the received interrupt relates to a process which requires access to the floating point registers 214B. The state indicators 235-1 to 235-4 can be set by the processing circuitry 212 as appropriate under hardware or software control by applying control signals via the bus 240.

In this way, the state circuitry 234 of the interrupt controller 230 generates state information corresponding to a selected interrupt, and applies a signal representing the state information to the processing circuitry 212 of the data processor via a signal line 239 in association with the selected interrupt which is applied via the signal line 238.

The processing circuitry 212 is able to utilise the state information acquired via the signal line 239 to determine whether the interrupt received on the signal line 238 relates to an integer context or a floating point context.

The data processor 210 also comprises configuration registers 240 including a control register 241 having a first bit 241A for indicating whether the current context is an integer context or a floating point context, a second bit 241B for indicating which of the main stack (MSP) and process stack (PSP) is currently in use, and a third bit 241C for indicating the privilege of a thread mode. In particular, the control register 241 corresponds to the control register 141 described above with reference to FIG. 4.

Figure 11:
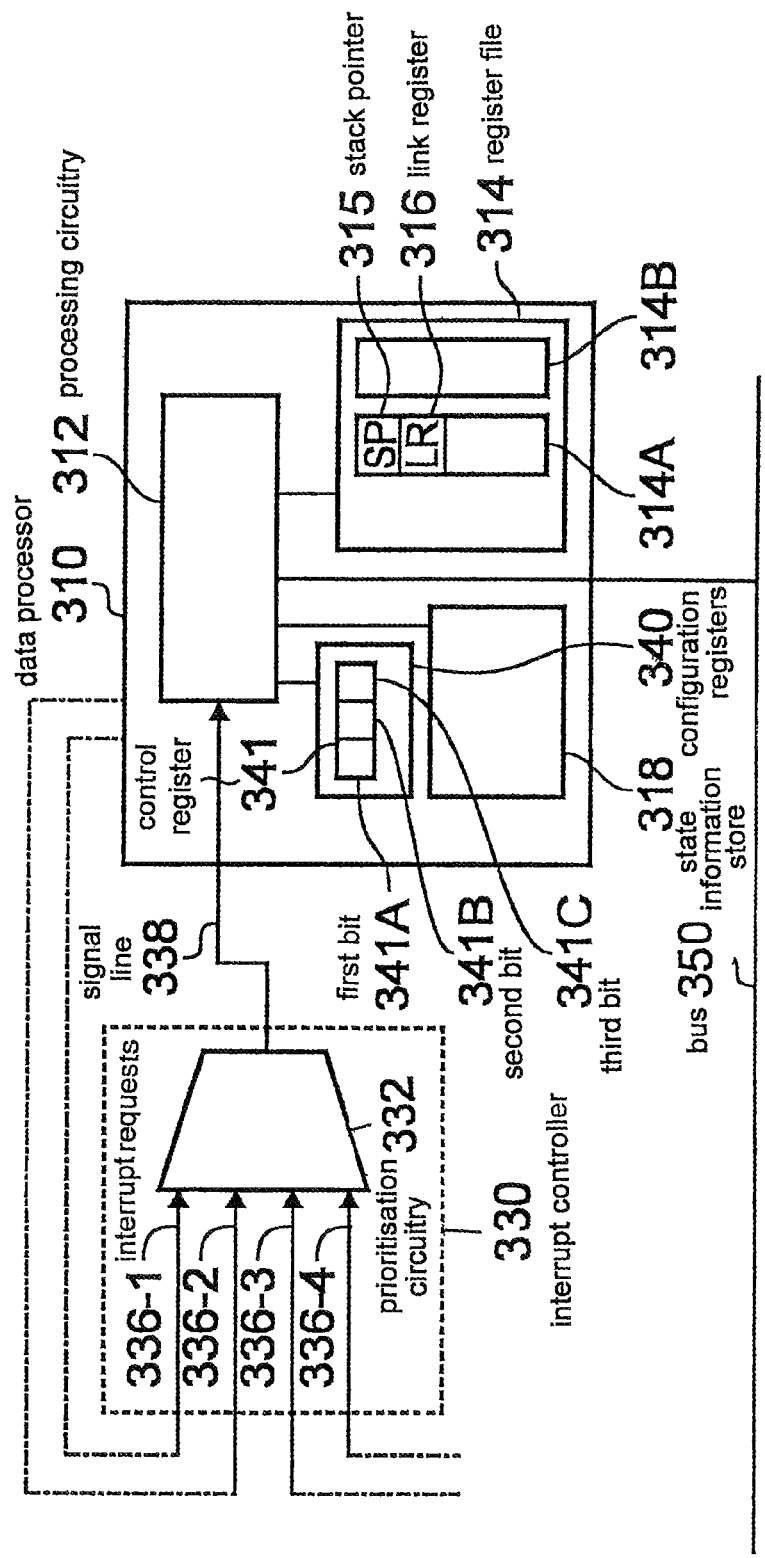
FIG. 11 schematically illustrates another example of the second embodiment in which state information is provided in the form of a look up table within a processor.

Referring to FIG. 11, another example data processor 310 and interrupt controller 330 are schematically illustrated in which a state store providing a look up table mapping possible interrupts to a corresponding state is provided within the data processor 310. The data processor 310 and the interrupt controller 330 are coupled together via a bus 340. The data processor 310 comprises (in a similar manner to FIG. 10) processing circuitry 312 and a register file 314 comprising integer registers 314A (which include a stack pointer 315 and a link register 316) and floating point registers 314B.

The interrupt controller 330 comprises prioritization circuitry 332 which takes the form of a multiplexer which selects between incoming interrupt requests 336-1 to 336-4 on the basis of relative priority. As with FIG. 10, the interrupt requests 336-1 and 336-2 are software interrupts generated by the processing circuitry 312, while interrupt requests 336-3 and 336-4 are hardware interrupts generated by hardware devices (not shown). The prioritization circuitry 332 selects between the interrupts 336-1 to 336-4 to generate an interrupt signal which is applied to the processing circuitry 312 via signal line 338 to indicate an interrupting process to be serviced by the processing circuitry 312.

In FIG. 11, a state information store 318 which is provided within the data processor 310 takes the place of the state circuitry 334 in FIG. 10, enabling a conventional interrupt controller to be used rather than the adapted interrupt controller provided in the arrangement of FIG. 10. The state information store 318 stores state information indicating for each of one or more possible interrupt requests, whether a process corresponding to that request requires the floating point registers 314B. The processing circuitry 312 is configured to read the state information from the state information store in response to a received interrupt request from the interrupt controller 330. In this way, the processing circuitry 312 is able to appropriately back up either only the integer registers 314A or both the integer registers 314A and floating point registers 314B. The state information store can be updated as appropriate under software or hardware control by the processing circuitry 312.

The data processor 310 also comprises configuration registers 340 including a control register 341 having a first bit 341A for indicating whether the current context is an integer context or a floating point context, a second bit 341B for indicating which of the main stack (MSP) and process stack (PSP) is currently in use, and a third bit 341C for indicating the privilege of a thread mode. In particular, the control register 341 corresponds to the control register 241 described above with reference to FIG. 10.

In the case of both the example of FIG. 10 and the example of FIG. 11, the state information from the interrupt controller or the state information store respectively provides an indication of whether the interrupting (target) data processing context is an integer context or a floating point context.

Where a current process is a handler, the state information indicating whether the current process is an integer process or a floating point process is obtained from either the interrupt controller (FIG. 10) or the state information store (FIG. 11) and is used to update bit [2] of the control register 241 or 341 respectively to indicate whether the current context is an integer context or a floating point context. When the current process is a thread, then bit [2] of the control register 241 or 341 is set directly by the hardware or software. In this way, the state required to determine whether an integer or floating point state preservation function is to be performed can be extracted from the interrupt controller or state information store which indicates whether the target context is an integer context or a floating point context, from bit [2] of the control register 241, 341 which indicates whether the current context is an integer context or a floating point context, and from bit

[1] of the control register 241, 341 which indicates (as described above) whether the current context is a thread or a handler.

An example preservation policy which is dependent on the context of the current and future processes, and on whether the current process is a thread or a handler is shown in Table 2, with an indication of whether integer only state preservation or integer and float state preservation is required.

TABLE 2

| Preservation Policy | | |
|---|---|---|
| Origin | Destination | Preserve to Stack |
| Integer thread | Integer handler | Integer only |
| Integer thread | Float handler | Integer only |
| Float thread | Integer handler | Integer only |
| Float thread | Float handler | Integer and float |
| Integer handler | Integer handler | Integer only |
| Integer handler | Float handler | Integer and float |
| Float handler | Integer handler | Integer only |
| Float handler | Float handler | Integer and float |

The preservation policy shown in Table 1 protects against loss of floating point register file data while only conducting floating point state preservation where there is a risk of overwrite.

Example processes and interrupts in accordance with the second embodiment will now be described with reference to FIGS. 12A to 12D.

Figure 12A:
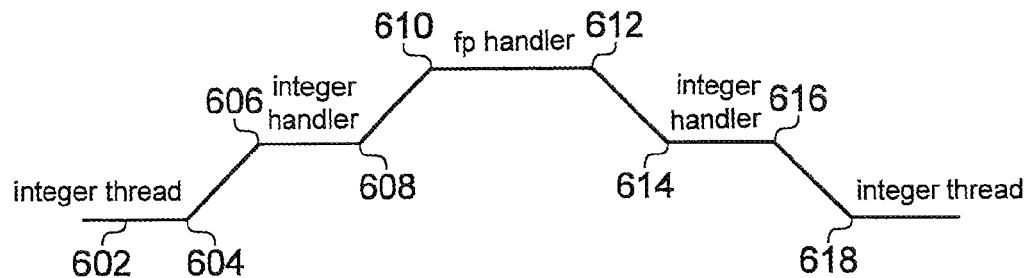
FIG. 12 schematically illustrates four example thread/handler progressions.

In FIG. 12A, a first example series of processes and interrupts is schematically illustrated. During period 602, an integer thread process (process 1A) is taking place, until interrupted at a point 604 by an interrupt triggering an integer handler process (process 2A). As described above, a context switch from an integer thread to an integer handler requires only the integer registers to be backed up, because the floating point registers will not and have not been used. The context switch occurs between the point 604 and a point 606 when the state preservation operation of the integer registers has been completed and the new integer handler process (2A) can commence.

The integer handler process (2A) continues until a point 608 when it is interrupted by an interrupt triggering a floating point handler process (process 3A). As described above, a context switch from an integer handler to a floating point handler requires both the integer registers and the floating point registers to be backed up, because the interrupting floating point handler process (3A) will use the floating point registers, and the integer handler process (2A) may itself have interrupted a floating point process which used the floating point registers. The context switch occurs between the point 608 and a point 610 when the state preservation operation of the integer and floating point registers has been completed and the new floating point handler process (3A) can commence. It will be appreciated that while the duration of the integer state preservation operation between the points 604 and 606 is shown for simplicity to be the same as the duration of the floating point state preservation operation between the points 608 and 610, the duration of the latter context switch may be greater due to the requirement to store more registers to the stack.

The floating point process (3A) which commenced at the point 610 then continues until a point 612 at which the floating point process (3A) terminates and the interrupted process (2A) can be resumed. To return to the interrupted process (2A) the backed up integer registers and floating point registers must be restored by reading the values stored to the stack in the integer and floating point state preservation process, and storing these values into the corresponding registers. This operation takes place between the point 612 and a point 614, after which the integer handler process (2A) can be resumed. The integer handler process (2A) then continues until a point 616 at which it terminates and the interrupted process (1A) can be resumed. To return to the interrupted process (1A) the backed up integer registers must be restored by reading the values stored to the stack in the integer state preservation operation, and storing these values into the corresponding registers. This restore operation takes place between the point 616 and a point 618, after which the integer thread process (1A) can be resumed.

In the above example, the integer thread (1A) may be an application process operating in a user mode and using the process stack (described above). The integer handler (2A) and the floating point handler (3A) may be operating system processes running in a privileged mode and using the main stack (described above). The stack pointer used for a user process utilising the process stack will be a process stack pointer (PSP) stored in register 13, whereas the stack pointer used for a privileged process utilising the main stack will be a main stack pointer (MSP) stored in register 13. The processing circuitry is therefore able to determine whether a process is a thread (user mode utilising the process stack) or a handler (privileged mode utilising the main stack) by examining the address pointed to by the stack pointer stored in register 13. The same technique may be used with each of the following examples.

Figure 12B:
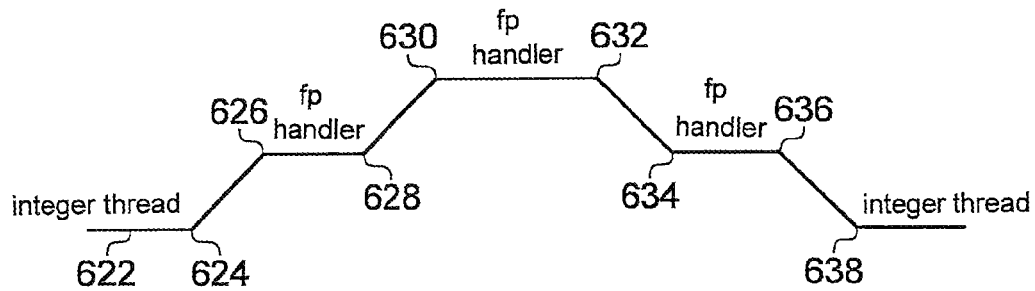

In FIG. 12B, a second example series of processes and interrupts is schematically illustrated. During period 622, an integer thread process (process 1B) is taking place, until interrupted at a point 624 by an interrupt triggering a floating point handler process (process 2B). As described above, a context switch from an integer thread to a floating point handler requires only the integer registers to be backed up, because the floating point registers have not previously been used, and thus will not need to be preserved. The context switch occurs between the point 624 and a point 626 when the state preservation operation of the integer registers has been completed and the new floating point handler process (2B) can commence.

The floating point handler process (2B) continues until a point 628 when it is interrupted by an interrupt triggering a further floating point handler process (process 3B). As described above, a context switch from a floating point handler to another floating point handler requires both the integer registers and the floating point registers to be backed up, because both the current floating point handler process (2B) and the interrupting floating point handler process (3B) will use the floating point registers. The context switch occurs between the point 628 and a point 630 when the state preservation operation of the integer and floating point registers has been completed and the new floating point handler process (3B) can commence.

The floating point process (3B) which commenced at the point 630 then continues until a point 632 at which the floating point process (3B) terminates and the interrupted process (2B) can be resumed. To return to the interrupted process (2B) the backed up integer registers and floating point registers must be restored by reading the values stored to the stack in the integer and floating point state preservation process, and storing these values into the corresponding registers. This operation takes place between the point 632 and a point 634, after which the floating point handler process (2B) can be resumed. The floating point handler process (2B) then continues until a point 636 at which it terminates and the interrupted process (1B) can be resumed. To return to the interrupted process (1B) the backed up integer registers and floating point registers must be restored by reading the values stored to the stack in the integer state preservation operation and the floating point state preservation operation, and storing these values into the corresponding registers. This restore operation takes place between the point 636 and a point 638, after which the integer thread process (1B) can be resumed.

Figure 12C:
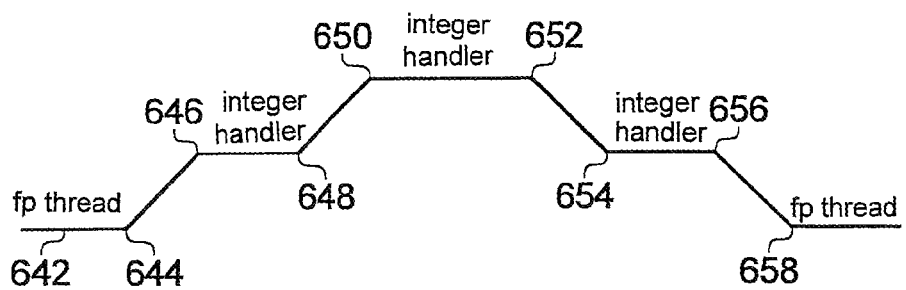

In FIG. 12C, a third example series of processes and interrupts is schematically illustrated. During period 642, a floating point thread process (process 1C) is taking place, until interrupted at a point 644 by an interrupt triggering an integer handler process (process 2C). As described above, a context switch from a floating point thread to an integer handler requires only the integer registers to be backed up, because the floating point registers will not be overwritten by the interrupting integer process. The context switch occurs between the point 644 and a point 646 when the state preservation operation of the integer registers has been completed and the new integer handler process (2C) can commence.

The integer handler process (2C) continues until a point 648 when it is interrupted by an interrupt triggering a further integer handler process (process 3C). As described above, a context switch from an integer handler to an integer handler requires only the integer registers to be backed up, because the interrupting handler process (3C) will not use the floating point registers. The context switch occurs between the point 648 and a point 650 when the state preservation operation of the integer registers has been completed and the new integer handler process (3C) can commence.

The integer handler process (3C) which, commenced at the point 650 then continues until a point 652 at which the integer process (3C) terminates and the interrupted process (2C) can be resumed. To return to the interrupted process (2A) the backed up integer registers must be restored by reading the values stored to the stack in the integer state preservation process, and storing these values into the corresponding registers. This operation takes place between the point 652 and a point 654, after which the integer handler process (2C) can be resumed. The integer handler process (2C) then continues until a point 656 at which it terminates and the interrupted process (1C) can be resumed. To return to the interrupted process (1C) the backed up integer registers must be restored by reading the values stored to the stack in the integer state preservation process, and storing these values into the corresponding registers. The floating point registers which are used by the floating point thread process (1C) have not been used by the interrupting processes (2C and 3C) and thus will still be preserved in the floating point registers. The restore operation takes place between the point 656 and a point 658, after which the floating point thread process (1C) can be resumed.

Figure 12D:
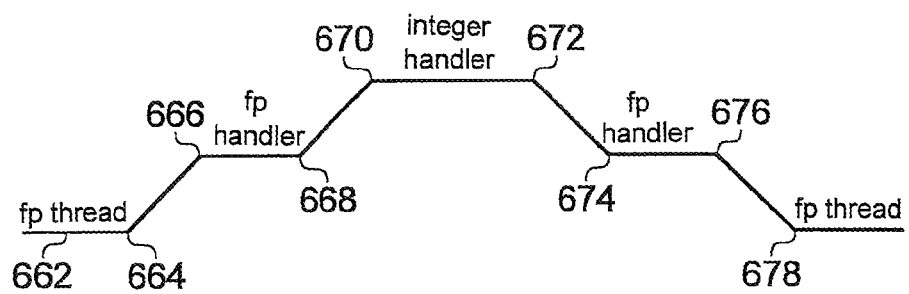

In FIG. 12D, a fourth example series of processes and interrupts is schematically illustrated. During period 662, a floating point thread process (process 1D) is taking place, until interrupted at a point 664 by an interrupt triggering a floating point handler process (process 2D). As described above, a context switch from a floating point thread to a floating point handler requires both the integer registers and the floating point registers to be backed up, because both the current floating point handler process (1D) and the interrupting floating point handler process (2D) will use the floating point registers. The context switch occurs between the point 664 and a point 666 when the state preservation operation of the integer registers and floating point registers has been completed and the new floating point handler process (2D) can commence.

The floating point handler process (2D) continues until a point 668 when it is interrupted by an interrupt triggering an integer handler process (process 3D). As described above, a context switch from a floating point handler to an integer handler requires only the integer registers to be backed up, because the interrupting integer handler process (3D) will not use the floating point registers. The context switch occurs between the point 668 and a point 670 when the state preservation operation of the integer registers has been completed and the new integer handler process (3D) can commence.

The integer process (3D) which commenced at the point 670 then continues until a point 672 at which the integer process (3D) terminates and the interrupted process (2D) can be resumed. To return to the interrupted process (2D) the backed up integer registers must be restored by reading the values stored to the stack in the integer state preservation process, and storing these values into the corresponding registers. This operation takes place between the point 672 and a point 674, after which the floating point handler process (2D) can be resumed. The floating point handler process (2D) then continues until a point 676 at which it terminates and the interrupted process (1D) can be resumed. To return to the interrupted process (1D) the backed up integer registers and floating point registers must be restored by reading the values stored to the stack in the integer and floating point state preservation processes, and storing these values into the corresponding registers. This restore operation takes place between the point 676 and a point 678, after which the floating point thread process (1D) can be resumed.

Figure 13:
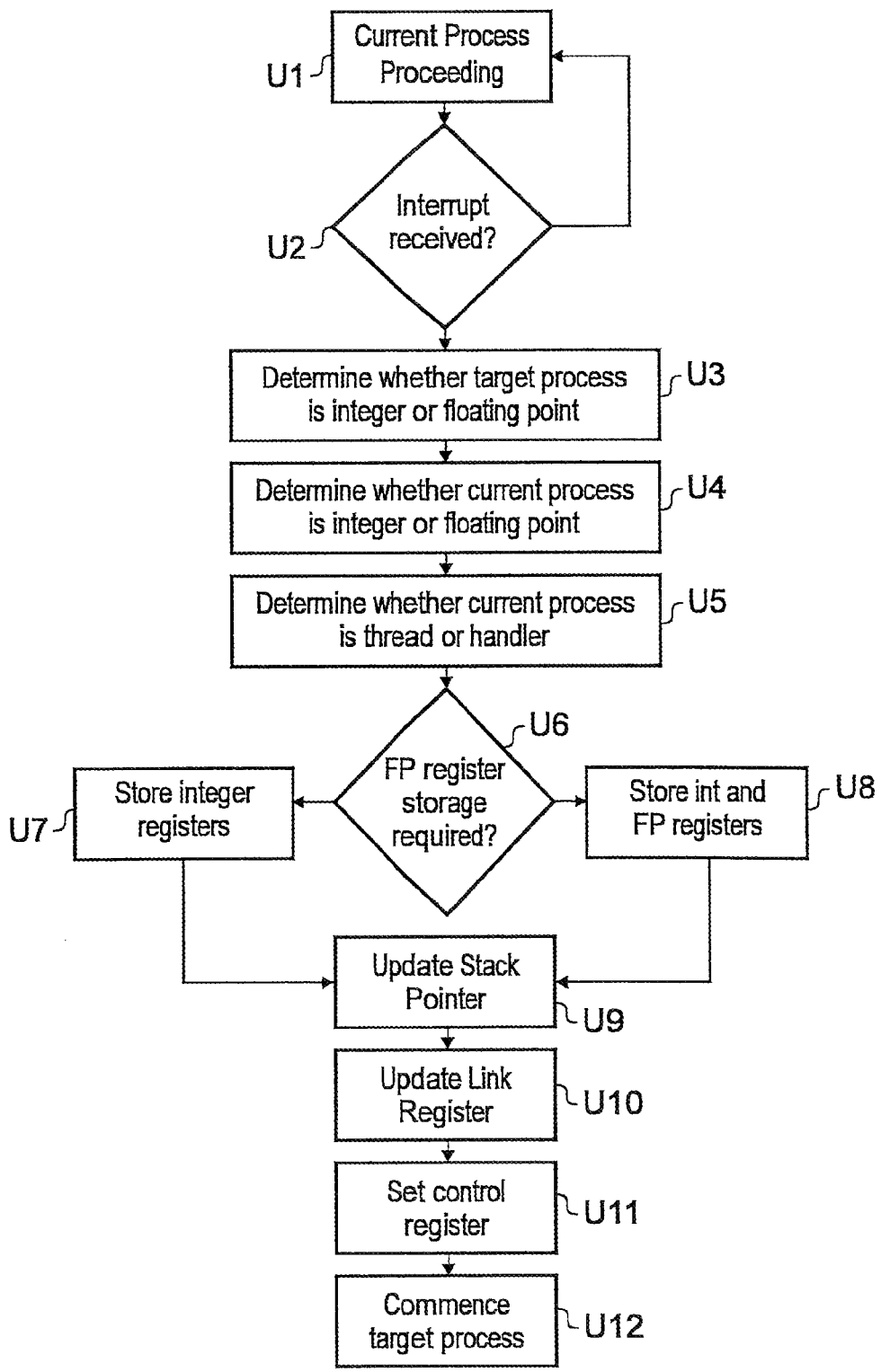
FIG. 13 is a schematic flow diagram illustrating a context switch method in response to an interrupt in accordance with the second embodiment.

FIG. 13 is a schematic flow diagram showing an example method of providing a context switch from a current process to a target process. At a step U1, a current process proceeds until an interrupt is received by the processing circuitry at a step U2. When the interrupt is received at the step U2, it is determined, at a step U3, whether the target process which is being initiated by the interrupt is an integer process or a floating point process. As described above, this determination may be made based on state information provided by an interrupt controller in association with the interrupt or obtained from a state information store provided within the data processor. Then, at a step U4, it is determined whether the current process is an integer process or a floating point process. As described above, this information may be stored into a bit [2] of the control register when the current process was initiated, either based on state information from the interrupt controller (where the current process is a handler), or set directly by the hardware or software (whether the current process is a thread). This indication can be extracted from that control register by the processing circuitry. Then, at a step U5, it is determined whether the current process is a thread process or a handler process. This determination may be made in dependence on whether bit [1] of the control register, which indicates whether the main stack is currently in use (indicating that the current process is a handler, or the process stack is currently in use (indicating that the current process is a thread). The information gathered at the steps U3 to U5 is that which is required in order to make a decision regarding whether only the integer registers should be stored to the stack, or whether both the integer registers and floating point registers should be stored to the stack.

At a step U6, the determination as to whether the floating point registers are to be stored is made. Then, in the case that the determination is made that the floating point registers are not to be stored, at a step U7 only the integer registers are stored to the stack. Then, the stack pointer is updated to reflect the new top of the stack at a step U8, and the link register is updated at a step U9 to store an indication of which of the main stack and the process stack have been used to store the preserved processor registers, and an indication that the interrupted process uses a floating point context. If at the step U6 a determination is made that the floating point registers are to be stored, then at a step U8 the integer registers and the floating point registers are stored to the stack. Then, the stack pointer is updated to reflect the new top of the stack at the step U8, and the link register is updated at the step U9 to store an indication that the interrupted process uses a floating point context.

At a step U11, bit [2] of the control register may be set to indicate whether the target process (to become the current process) based on the information obtained at the step U3 indicating whether the interrupting process uses an integer or floating point data processing context. Finally, at a step U12 the target process is commenced. When the target process is commenced, if the target process triggered by the interrupt request attempts to use the floating point registers when the state information obtained at the step U3 and stored in bit [2] of the control register at the step U11 indicates that the target data processing context is an integer data processing context, an exception is generated by the processing circuitry. This exception will halt the target process before the floating point registers can be overwritten, thereby preventing loss of floating point register data which has not been stored to the stack. The exception could then be dealt with simply by conducting the floating point state preservation operation at that point, or by terminating the target process.

Figure 14:
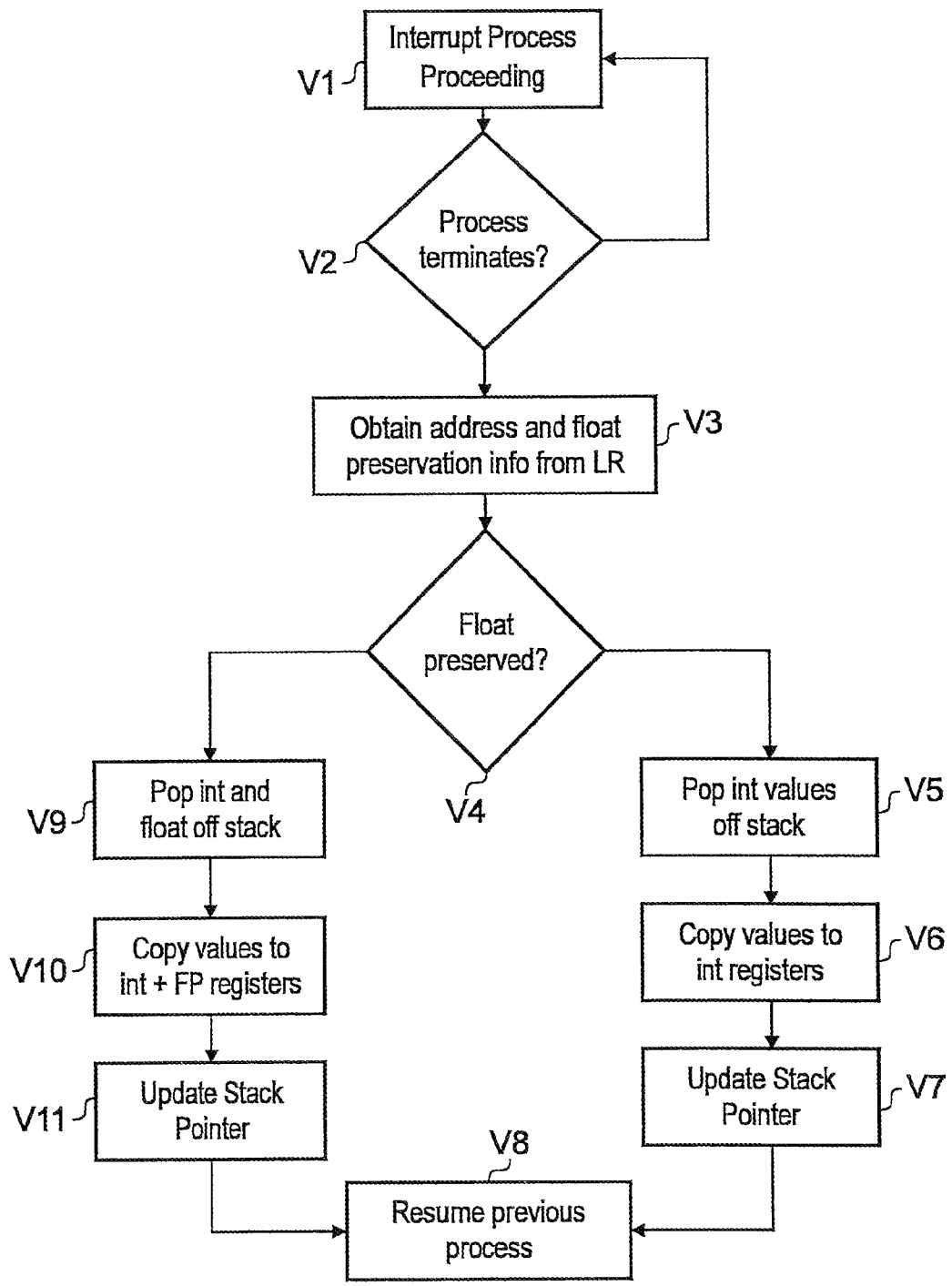
FIG. 14 is a schematic flow diagram illustrating a context switch method occurring when an interrupting process has completed in accordance with the second embodiment.

FIG. 14 is a schematic flow diagram showing an example method of providing a context switch from the target (interrupting) process back to the thread or handler process which was interrupted by the target process. At a step V1, the process triggered by an interrupt (such as that described with reference to FIG. 13) proceeds until it terminates at a step V2. Once the process terminates at the step V2, the link register is read at a step V3 to determine to which of the main stack and the process stack the processor registers were copied, and to determine whether the interrupted process used a floating point context (which forms an indication of how much data (integer frame or floating point frame) is to be popped from the stack). At a step V4 it is determined based on the value stored in the link register whether the floating point registers were stored to the stack when the process was interrupted. If it is determined at the step V4 that the floating point registers were stored to the stack, the appropriate amount of data is popped from the stack at a step V5 to obtain the data values of the integer and floating point registers, and the obtained values would be stored to the corresponding registers at a step V6. In the case of the example shown in FIGS. 2 and 3 this would require an amount of data corresponding to 26 registers to be popped from the stack. If on the other hand it is determined at the step V5 that the floating point registers were not stored to the stack, a smaller amount of data is popped off the stack at a step V7, and copied into the integer registers at a step V8. In the case of the example shown in FIGS. 2 and 3 this would require an amount of data corresponding to 8 registers to be popped from the stack. At a step V9, once either the step V6 or the step V8 has been completed, the previous process is resumed.

Various further aspects and features of the present invention are defined in the appended claims. Various modifications can be made to the embodiments herein before described without departing from the scope of the present invention.

I claim:

1. A data processing apparatus, comprising:
    a first set of integer registers;
    a second set of floating point registers; and
    processing circuitry responsive to data processing instructions and configured to execute integer data processing operations using the first set of integer registers and floating point data processing operations using the second set of integer registers;
    wherein:
    said processing circuitry is responsive to an interrupt request to perform one of an integer state preservation function in which at least a subset of said integer registers are copied to a stack memory without copying said floating point registers to the stack memory, and a floating point state preservation function in which at least a subset of both said integer registers and said floating point registers are copied to said stack memory, said one of said integer state preservation function and said floating point state preservation function being selected by said processing circuitry in dependence on state information, said state information comprises first state information indicative of whether a current data processing context being executed by said processing circuitry when the interrupt request is received is a floating point data processing context which includes one or more floating point data processing operations or an integer data processing context which does not include any floating point data processing operations;
    said first state information is set in response to a data processing instruction which causes the processing circuitry to execute floating point data processing operations;
    said processing circuitry is responsive to said interrupt request to perform said integer state preservation function if said first state information indicates that the current data processing context is an integer data processing context, and to perform, if said first state information indicates that the current data processing context is a floating point data processing context, a first part of said floating point state preservation function in which the subset of integer registers are copied to the stack memory and a second part of said floating point state preservation function including allocating space on the stack memory for the subset of floating point registers without copying the subset of floating point registers to the stack memory; and
    said processing circuitry is configured to perform a third part of said floating point state preservation function in which the subset of floating point registers are copied to the allocated portion of the stack memory, responsive to a determination that a data processing instruction is to be executed following the allocation of space on the stack memory, which causes the processing circuitry to execute floating point data processing operations.

2. A data processing apparatus according to claim 1, wherein, when said integer state preservation function is performed, said processing circuitry sets second state information to indicate that space for the floating point registers has not been allocated to the stack memory, and when said second part of the floating point state preservation function is performed, said processing circuitry sets said second state information to indicate that space for the floating point registers has been allocated in the stack memory.

3. A data processing apparatus according to claim 1, comprising a stack allocation address register for storing a memory address of the portion of the stack memory allocated in said second part of said floating point state preservation function, wherein said processing circuitry copies the floating point registers to an address within the stack memory indicated by said stack allocation address register in a third part of the floating point state preservation function.

4. A data processing apparatus according to claim 1, wherein third state information is set in said second part of the floating point state preservation function to indicate that space has been allocated in the stack memory but that the copying of the floating point registers has not yet occurred, and wherein said third state information is reset as part of said third part of the floating point state preservation function to indicate that the floating point registers have been copied into the allocated space in the stack memory.

5. A data processing apparatus according to claim 4, wherein said processing circuitry is responsive to termination of a target data processing context executed by said processing circuitry as a result of said interrupt request to perform one of an integer state recovery function in which data preserved from said integer registers onto said stack memory are obtained from the stack memory and copied into corresponding registers, and a floating point state recovery function in which data preserved from said integer and floating point registers onto said stack memory are obtained from the stack memory and copied into corresponding registers, wherein said integer state recovery function is selected by said processing circuitry if second state information indicates that the floating point registers have not been stored into the stack memory or if the second state information indicates that space has been allocated in the stack memory for the floating point registers and the third state information indicates that the copying of the subset of floating point registers to the allocated portion of the stack memory has not yet occurred, and said floating point state recovery function is selected by said processing circuitry if the second state information indicates that space has been allocated in the stack memory for the floating point registers and the third state information indicates that the subset of floating point registers have been copied to the allocated portion of the stack memory.

6. A data processing apparatus according to claim 5, wherein, when said integer state recovery function is performed, said first state information is set to indicate that the current data processing context is an integer data processing context, and when said floating point state recovery function is performed, said first state information is set to indicate that the current data processing context is a floating point data processing context.

7. A data processing apparatus according to claim 1, wherein said processing circuitry is responsive to fourth state information to select between a floating point state preservation function in which the floating point registers are copied to the stack memory in response to the interrupt request, and a floating point state preservation function in which space in the stack memory is allocated for the floating point registers in response to the interrupt request and in which the floating point registers are copied into the allocated space in response to a data processing instruction following the allocation of space on the stack memory which causes the processing circuitry to execute floating point data processing operations.

8. A data processing apparatus according to claim 1, wherein said state information comprises second state information which is indicative of whether a target data processing context to be executed by said processing circuitry as a result of said interrupt request is a floating point data processing context which includes one or more floating point data processing operations or an integer data processing context which does not include any floating point data processing operations.

9. A data processing apparatus according to claim 8, further comprising an interrupt controller for generating said interrupt request; wherein:

said interrupt controller stores said second state information in association with one or more possible interrupt requests, and communicates said second state information associated with a selected one of said possible interrupt requests to said processing circuitry along with the selected interrupt request.

10. A data processing apparatus according to claim 8, comprising:

a state information store for storing said second state information in association with one or more possible interrupt requests, said processing circuitry being configured to read said second state information from said state information store in response to a received interrupt request.

11. A data processing apparatus according to claim 8, wherein if said target data processing context triggered by said interrupt request attempts to use said floating point registers when said second state information indicates that the target data processing context is an integer data processing context, said processing circuitry generates an exception.

12. A data processing apparatus according to claim 1, wherein said state information comprises third state information which is indicative of whether a current data processing context is a thread data processing context which has not been triggered by an interrupt request, or a handler data processing context which has been triggered by an interrupt request.

13. A data processing apparatus according to claim 1, wherein said processing circuitry is responsive to state information indicating that a target data processing context to be executed by said processing circuitry as a result of said interrupt request is a floating point data processing context, and that said current data processing context is either a floating point data processing context, or an integer data processing context triggered by an interrupt request, to select said floating point state preservation function.

14. A data processing apparatus according to claim 1, wherein said processing circuitry is responsive to state information indicating that said current data processing context is an integer data processing context and that a target data processing context to be executed by said processing circuitry as a result of said interrupt request is an integer data processing context to select said integer state preservation function.

15. A data processing apparatus according to claim 1, wherein said processing circuitry is responsive to state information indicating that said current data processing context is a floating point data processing context and that a target data processing context to be executed by said processing circuitry as a result of said interrupt request is a floating point data processing context to select said floating point state preservation function.

16. A data processing apparatus according to claim 1, wherein
said processing circuitry is responsive to state information indicating that said current data processing context is an integer thread context not triggered by an interrupt request, and that a target data processing context to be executed by said processing circuitry as a result of said interrupt request is a floating point data processing context, to select said integer state preservation function.

17. A data processing apparatus according to claim 1, wherein
said processing circuitry is responsive to state information indicating that said current data processing context is an integer handler context triggered by an interrupt request, and that a target data processing context to be executed by said processing circuitry as a result of said interrupt request is a floating point data processing context, to select said floating point state preservation function.

18. A data processing apparatus according to claim 1, wherein said first set of integer registers comprises a register for storing a stack pointer, said stack pointer pointing to the top of a process stack when the current data processing context is a thread, and pointing to the top of a main stack when the current data processing context is a handler, and wherein third state information is provided by said stack pointer.

19. A data processing apparatus according to claim 18, wherein said first set of integer registers comprises a link register for storing a return address to a previous data processing context, and an indication of whether the previous data processing context is an integer data processing context or a floating point data processing context, and wherein
said processing circuitry is responsive to said interrupt request to set the link register to include a stack pointer of the current data processing context, and an indication of whether the current data processing context is an integer data processing context or a floating point data processing context.

20. A data processing apparatus according to claim 19, wherein said processing circuitry is responsive to termination of said target data processing context to perform one of an integer state recovery function in which data preserved from said integer registers onto said stack memory are obtained from the stack memory and copied into corresponding registers, and a floating point state recovery function in which data preserved from said integer and floating point registers onto said stack memory are obtained from the stack memory and copied into corresponding registers, wherein
said one of said integer state recovery function and said floating point state recovery function is selected by said processing circuitry in dependence on whether the stack pointer within the link register points to the main stack or the process stack, and on whether the link register indicates that the previous data processing context was an integer data processing context or a floating point data processing context.

21. A data processing apparatus according to claim 1, wherein said state information is configurable by said processing circuitry.

22. A data processing apparatus according to claim 1, wherein said floating point state preservation function is conducted by first copying said first set of integer registers to said stack memory, and then copying said second set of floating point registers to the top of said stack memory.

23. A data processing apparatus according to claim 22, wherein said processing circuitry is responsive to a higher priority interrupt requiring an integer state preservation function received while said floating point state preservation function is being conducted to inhibit the copying of said second set of floating point registers to said stack memory, and to set a stack pointer to indicate the first set of integer registers to be at the top of said stack memory.

24. A data processing apparatus according to claim 22, wherein said floating point state preservation function is conducted by first copying said second set of floating point registers to said stack memory, and then copying said first set of integer registers to said stack memory.

25. A data processing apparatus according to claim 1, wherein said processing circuitry is responsive to fourth state information to perform said integer state preservation function in response to an interrupt request irrespective of the state information.

26. A data processing apparatus according to claim 1, wherein said interrupt request is an interrupt request received from an interrupt controller to trigger the processing circuitry to suspend a current context and service a new context.

27. A data processing apparatus according to claim 1, wherein said processing circuitry is configured to perform both said first part and said second part of said floating point state preservation function in response to the same interrupt request.

28. A data processing apparatus according to claim 1, wherein said processing circuitry is configured to perform said first part and said second part of said floating point state preservation function in response to said same interrupt request without an intervening interrupt request between the first part and the second part.

29. A data processing apparatus according to claim 1, wherein said data processing instruction to be executed following the allocation of space on the stack memory comprises an instruction to be executed following commencement of a target process to be executed as a result of said interrupt request.

30. A data processing method of executing integer data processing operations and floating point data processing operations in response to data processing instructions, said integer data processing operations using a first set of integer registers, and said floating point data processing operations using a second set of floating point registers, the method comprising the steps of:
performing, in response to an interrupt request, one of an integer state preservation function in which at least a subset of said integer registers are copied to a stack memory without copying said floating point registers to the stack memory, and a floating point state preservation function in which at least a subset of both said integer registers and said floating point registers are copied to said stack memory, said one of said integer state preservation function and said floating point state preservation function being selected in dependence on state information; wherein:
said state information comprises first state information indicative of whether a current data processing context being executed when the interrupt request is received is a floating point data processing context which includes one or more floating point data processing operations or an integer data processing context which does not include any floating point data processing operations;
said first state information is set in response to a data processing instruction which causes floating point data processing operations to be executed;
in response to said interrupt request, performing said integer state preservation function if said first state information indicates that the current data processing context is an integer data processing context, and performing, if said first state information indicates that the current data processing context is a floating point data processing context, a first part of said floating point state preservation function in which the subset of integer registers are copied to the stack memory and a second part of said floating point state preservation function including allocating space on the stack memory for the subset of floating point registers without copying the subset of floating point registers to the stack memory; and performing a third part of said floating point state preservation function in which the subset of floating point registers are copied to the allocated portion of the stack memory in response to a determination that a data processing instruction is to be executed following the allocation of space on the stack memory which causes execution of floating point data processing operations.

31. A computer program product including a non-transitory computer readable storage medium storing a computer program operable to cause a computer to execute a method according to claim 30.

32. A data processing apparatus, comprising:
a first set of integer register means;
a second set of floating point register means; and
processing means responsive to data processing instructions and configured to execute integer data processing operations using the first set of integer registers means and floating point data processing operations using the second set of integer register means; and
wherein:
said processing means is responsive to an interrupt request to perform one of an integer state preservation function in which at least a subset of said integer registers are copied to a stack memory without copying said floating point registers to the stack memory, and a floating point state preservation function in which at least a subset of both said integer registers and said floating point registers are copied to said stack memory, said one of said integer state preservation function and said floating point state preservation function being selected by said processing means in dependence on state information;

said state information comprises first state information indicative of whether a current data processing context being executed by said processing means when the interrupt request is received is a floating point data processing context which includes one or more floating point data processing operations or an integer data processing context which does not include any floating point data processing operations;

said first state information is set in response to a data processing instruction which causes the processing means to execute floating point data processing operations; wherein said processing means is responsive to said interrupt request to perform said integer state preservation function if said first state information indicates that the current data processing context is an integer data processing context, and to perform, if said first state information indicates that the current data processing context is a floating point data processing context, a first part of said floating point state preservation function in which the subset of integer registers are copied to the stack memory and a second part of said floating point state preservation function including allocating space on the stack memory for the subset of floating point registers without copying the subset of floating point registers to the stack memory; and said processing means is configured to perform a third part of said floating point state preservation function in which the subset of floating point registers are copied to the allocated portion of the stack memory, responsive to a determination that a data processing instruction is to be executed following the allocation of space on the stack memory, which causes the processing means to execute floating point data processing operations.

\* \* \* \* \*